(12) United States Patent
Mitchell et al.

(10) Patent No.: US 7,903,889 B2
(45) Date of Patent: *Mar. 8, 2011

(54) SYSTEM AND COMPUTER READABLE MEDIUM FOR THE SCALING DOWN OF DATA

(75) Inventors: Joan LaVerne Mitchell, Longmont, CO (US); Timothy James Trenary, Fort Collins, CO (US); Nenad Rijavec, Longmont, CO (US); Ian Richard Finlay, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/259,936

(22) Filed: Oct. 28, 2008

(65) Prior Publication Data
US 2009/0060358 A1 Mar. 5, 2009

Related U.S. Application Data

(63) Continuation of application No. 10/983,076, filed on Nov. 4, 2004, now Pat. No. 7,463,777, which is a continuation of application No. 09/570,849, filed on May 12, 2000, now Pat. No. 7,062,098.

(51) Int. Cl.
*G06K 9/32* (2006.01)
*G06K 9/36* (2006.01)

(52) U.S. Cl. ......... 382/235; 382/248; 382/250; 382/298; 382/299

(58) Field of Classification Search .............. 382/235, 382/248, 250, 298, 299; 345/127, 660, 688, 345/669, 670; 358/1.2, 451; 375/240, 240.03, 375/240.18, 240.2, 240.21; 708/400, 402, 708/403, 650
See application file for complete search history.

(56) References Cited

U.S. PATENT DOCUMENTS

| | | | |
|---|---|---|---|
| 4,394,693 | A | 7/1983 | Shirley |
| 5,107,345 | A | 4/1992 | Lee |
| 5,253,078 | A | 10/1993 | Balkanski et al. |
| 5,262,854 | A | 11/1993 | Ng |
| 5,321,522 | A | 6/1994 | Eschbach |
| 5,572,236 | A | 11/1996 | Feig et al. |
| 5,602,594 | A | 2/1997 | Cho et al. |
| 5,629,778 | A | 5/1997 | Reuman |
| 5,708,732 | A | 1/1998 | Merhav et al. |

(Continued)

OTHER PUBLICATIONS de Queiroz et al., "Fast Downscaled Inverses for Images Compressed with M-Channel Lapped Transforms." IEEE Trans. on Image Processing, vol. 6, No. 6, Jun. 1997, pp. 794-807.

(Continued)

*Primary Examiner* — Brian Q Le
(74) *Attorney, Agent, or Firm* — Janaki K. Davda; Konrad Raynes & Victor LLP

(57) ABSTRACT

The scaling down of data is provided. At least two blocks of transformed data samples representing at least two blocks of original data samples are received. One of at least two tables of constants is selected wherein each table of constants is capable of reducing the number of transformed data samples by a different factor. The constants taken from the selected table are applied to the at least two blocks of transformed data samples to produce one block of transformed data samples representing one block of final data samples. The data is processed one dimension at a time by multiplying the data in one dimension with selected constants taken from previously developed tables corresponding to the desired scale down factor. Scaling down by different factors in each dimension as well as scaling down in one dimension and scaling up in the other dimension may be achieved.

12 Claims, 11 Drawing Sheets

U.S. PATENT DOCUMENTS

| | | | |
|---|---|---|---|
| 5,712,809 A | 1/1998 | Girod et al. |
| 5,724,453 A | 3/1998 | Ratnakar et al. |
| 5,737,450 A | 4/1998 | Hajjahmad et al. |
| 5,740,284 A | 4/1998 | Wober et al. |
| 5,751,846 A | 5/1998 | Higgins-Luthman et al. |
| 5,825,680 A | 10/1998 | Wheeler et al. |
| 5,832,120 A | 11/1998 | Prabhakar et al. |
| 5,832,135 A | 11/1998 | Merhav et al. |
| 5,832,435 A | 11/1998 | Silverman |
| 5,845,015 A | 12/1998 | Martucci |
| 5,850,484 A | 12/1998 | Beretta et al. |
| 5,859,788 A | 1/1999 | Hou |
| 5,872,874 A | 2/1999 | Natarajan |
| 5,875,039 A | 2/1999 | Ohsawa et al. |
| 5,883,823 A | 3/1999 | Ding |
| 5,886,743 A | 3/1999 | Oh et al. |
| 5,933,542 A | 8/1999 | Chang et al. |
| 6,002,809 A | 12/1999 | Feig et al. |
| 6,075,906 A | 6/2000 | Fenwick et al. |
| 6,307,968 B1 | 10/2001 | Liguori |
| 6,308,193 B1 | 10/2001 | Jang et al. |
| 6,456,745 B1 | 9/2002 | Bruton et al. |
| 6,970,179 B1 | 11/2005 | Trenary et al. |
| 7,062,098 B1 | 6/2006 | Mitchell et al. |
| 7,373,003 B2 | 5/2008 | Mitchell et al. |
| 2005/0058355 A1 | 3/2005 | Mitchell et al. |
| 2005/0117809 A1 | 6/2005 | Mitchell et al. |
| 2008/0212885 A1 | 9/2008 | Mitchell et al. |

OTHER PUBLICATIONS

Feig, Finlay, and Mitchell, "Transform Domain Scaling for Non-Commensurable Ratios", IBM TDB vol. 38, No. 6, Jun. 1995.

Hu, Q. and S. Panchanathan, "Image/Video Spatial Scalability in Compressed Domain" IEEE Transactions on Industrial Electronics, vol. 45, No. 1, Feb. 1998, pp. 23-31.

Merhav, N. and V. Bhaskaran, "A Transform Domain Approach to Spatial Domain Image Scaling." Proc. IEEE Int. Conf. on Acoustics, Speech, and Signal Processing, vol. 4, May 7, 1996, pp. 2403-2406.

Natarajan, B.K. and V. Bhaskaran, "A Fast Approximate Algorithm for Scaling Down Digital Images in the DCT Domain." Proc. Int. Conf. on Image Processing, vol. 2, Oct. 23, 1995, pp. 241-243.

Shen, B., I.K. Sethi, and V. Bhaskaran, "Adaptive Motion Vector Resampling for Compressed Video Down-Scaling", © 1997 IEEE, 4 pp.

| A\B | 1 | 2 | 3 | 4 | 5 | 6 | 7 | 8 | 9 | 10 | 11 | 12 |
|---|---|---|---|---|---|---|---|---|---|---|---|---|
| 1 | . | 2 | 3 | 4 | 5 | 6 | 7 | 8 | 9 | 10 | 11 | 12 |
| 2 | 0.5 | . | 1.5 | . | 2.5 | . | 3.5 | . | 4.5 | . | 5.5 | . |
| 3 | 0.333 | 0.667 | . | 1.333 | 1.667 | . | 2.333 | 2.667 | . | 3.333 | 3.667 | . |
| 4 | 0.25 | . | 0.75 | . | 1.25 | . | 1.75 | . | 2.25 | . | 2.75 | . |
| 5 | 0.2 | 0.4 | 0.6 | 0.8 | . | 1.2 | 1.4 | 1.6 | 1.8 | . | 2.2 | 2.4 |
| 6 | 0.167 | . | . | . | 0.833 | . | 1.167 | . | . | . | 1.833 | . |
| 7 | 0.143 | 0.286 | 0.429 | 0.571 | 0.714 | 0.857 | . | 1.143 | 1.286 | 1.429 | 1.571 | 1.714 |
| 8 | 0.125 | . | 0.375 | . | 0.625 | . | 0.875 | . | 1.125 | . | 1.375 | . |
| 9 | 0.111 | 0.222 | . | 0.444 | 0.556 | . | 0.778 | 0.889 | . | 1.111 | 1.222 | . |
| 10 | 0.1 | . | 0.3 | . | . | . | 0.7 | . | 0.9 | . | 1.1 | . |
| 11 | 0.091 | 0.182 | 0.273 | 0.364 | 0.455 | 0.545 | 0.636 | 0.727 | 0.818 | 0.909 | . | 1.091 |
| 12 | 0.083 | . | . | . | 0.417 | . | 0.583 | . | . | . | 0.917 | . |

FIG. 11

SYSTEM AND COMPUTER READABLE MEDIUM FOR THE SCALING DOWN OF DATA

CROSS REFERENCE TO RELATED APPLICATIONS

This application is a continuation of and claims the benefit of U.S. Pat. No. 7,463,777 issued on Dec. 9, 2008, with application Ser. No. 10/983,076, filed on Nov. 4, 2004, which is a continuation of and claims the benefit of U.S. Pat. No. 7,062,098 issued on Jun. 13, 2006, with application Ser. No. 09/570,849 filed on May 12, 2000, the disclosure of each of which is incorporated herein by reference in its entirety.

This application is related to U.S. Pat. No. 7,373,003 issued on May 13, 2008, which is a divisional of U.S. Pat. No. 7,062,098 issued on Jun. 13, 2006, with application Ser. No. 09/570,849 filed on May 12, 2000, the disclosure of each of which is incorporated herein by reference in its entirety.

This application is related to U.S. Publication No. 2008/0212885 published on Sep. 4, 2008, which is a continuation of and claims the benefit of U.S. Pat. No. 7,373,003 issued on May 13, 2008, which is a divisional of U.S. Pat. No. 7,062,098 issued on Jun. 13, 2006, with application Ser. No. 09/570,849 filed on May 12, 2000, the disclosure of each of which is incorporated herein by reference in its entirety.

The present application is related to the following U.S. patent applications: U.S. Pat. No. 6,256,422 issued Jul. 3, 2001, with Ser. No. 09/186,245 filed Nov. 4, 1998, by Joan L. Mitchell and Martin J. Bright for "Transform-Domain Correction of Real Domain Errors"; U.S. Pat. No. 6,393,155 issued May 21, 2002, with Ser. No. 09/186,249 filed Nov. 4, 1998 by Martin J. Bright and Joan L. Mitchell for "Error Reduction in Transformed Digital Data"; U.S. Pat. No. 6,535,645 issued Mar. 18, 2003 and which is a divisional application of U.S. Pat. No. 6,393,155; U.S. Pat. No. 7,194,138 issued Mar. 20, 2007, with Ser. No. 09/186,247 filed Nov. 4, 1998 by Martin J. Bright and Joan L. Mitchell for "Reduced-error Processing of Transformed Digital Data"; U.S. Pat. No. 6,671,414 issued Dec. 30, 2003, with Ser. No. 09/524,266, filed Mar. 13, 2003, by Charles A. Micchelli, Marco Martens, Timothy J. Trenary and Joan L. Mitchell for "Shift and/or Merge of Transformed Data Along One Axis"; U.S. Pat. No. 6,678,423 issued Jan. 13, 2004, with Ser. No. 09/524,389, filed Mar. 13, 2003, by Timothy J. Trenary, Joan L. Mitchell, Charles A. Micchelli, and Marco Martens for "Shift and/or Merge of Transformed Data Along Two Axes"; and U.S. Pat. No. 6,970,179 issued Nov. 29, 2005, with Ser. No. 09/570,382, filed May 12, 2000, by Timothy J. Trenary, Joan L. Mitchell, Ian R. Finlay and Nenad Rijavec for "Method and Apparatus For The Scaling Up Of Data", all assigned to a common assignee with this application and the disclosures of which are incorporated herein by reference in their entirety.

BACKGROUND OF THE INVENTION

1. Field of the Invention

This invention relates to a method and apparatus for efficiently scaling down data which has been transformed from the real domain.

2. Description of the Related Art

Many types of data, such as radar data, oil well log data and digital image data, can consume a large amount of computer storage space. For example, computerized digital image files can require in excess of 1 MB. Therefore, several formats have been developed which manipulate the data in order to compress it. The discrete cosine transform (DCT) is a known technique for data compression and underlies a number of compression standards.

The mathematical function for a DCT in one dimension is:

$$\tilde{s}(k) = c(k) \sum_{n=0}^{N-1} s(n) \cos \frac{\pi(2n+1)k}{2N}, \qquad (1)$$

where $s$ is the array of $N$ original values, $\tilde{s}$ is the array of $N$ transformed values and the coefficients $c$ are given by $c(k) = \sqrt{\frac{1}{N}}$ for $k = 0$; $c(k) = \sqrt{\frac{2}{N}}$ for $k > 0$ Taking for example the manipulation of image data, blocks of data consisting of 8 rows by 8 columns of data samples frequently are operated upon during image resizing processes. Therefore a two-dimensional DCT calculation is necessary. The equation for a two-dimensional DCT where N=8 is:

$$\tilde{s}(i,j) = c(i,j) \sum_{n=0}^{7} \sum_{m=0}^{7} s(m,n) \cos \frac{\pi(2m+1)i}{16} \cos \frac{\pi(2m+1)j}{16}, \qquad (2)$$

where $s$ is an 8×8 matrix of 64 values; $\tilde{s}$ is an 8×8 matrix of 64 coefficients and the constants $c(i,j)$ are given by $c(i,j) = \frac{1}{8}$, when $i = 0$ and $j = 0$; $c(i,j) = \frac{1}{4\sqrt{2}}$ if $i = 0$ and $j > 0$ or $i > 0$ and $j = 0$; $c(i,j) = \frac{1}{4}$ when $i, j > 0$ Because data is taken from the "real" or spatial image domain and transformed into the DCT domain by equations (1) and (2), these DCT operations are referred to as forward Discrete Cosine Transforms (FDCT), or forward transform operations.

As previously mentioned, the DCT is an image compression technique which underlies a number of compression standards. These include the well-known Joint Photographic Experts Group (JPEG) and the Moving Picture Experts Group (MPEG) standards. Comprehensive references on the JPEG and MPEG standards include *JPEG Still Image Data Compression Standard* by William B. Pennebaker and Joan L. Mitchell (© 1993 Van Nostrand Reinhold), and *MPEG Video Compression Standard* by Joan L. Mitchell, William B. Pennebaker, et al (© 1997 Chapman & Hall).

Looking at the JPEG method, for example, there are five basic steps. Again taking the example of the manipulation of image data, the first step is to extract an 8×8 pixel block from the image. The second step is to calculate the FDCT for each block. Third, a quantizer rounds off the DCT coefficients according to the specified image quality. Fourth, the quantized, two-dimensional 8×8 block of DCT coefficients are reordered into a one-dimensional vector according to a zig zag scan order. Fifth, the coefficients are compressed using an entropy encoding scheme such as Huffman coding or arithmetic coding. The final compressed data is then written to the output file.

Returning to the first step, source image samples are grouped into 8×8 data matrices, or blocks. The initial image data is frequently converted from normal RGB color space to a luminance/chrominance color space, such as YUV. YUV is a color space scheme that stores information about an image's luminance (brightness) and chrominance (hue). Because the human eye is more sensitive to luminance than chrominance, more information about an image's chrominance can be discarded as compared to luminance data.

Once an 8×8 data block has been extracted from the original image and is in the desired color scheme, the DCT coefficients are computed. The 8×8 matrix is entered into the DCT algorithm, and transformed into 64 unique, two-dimensional spatial frequencies thereby determining the input block's spectrum.

The ultimate goal of this FDCT step is to represent the image data in a different domain using the cosine functions. This can be advantageous because it is a characteristic of cosine functions that most of the spatial frequencies will disappear for images in which the image data changes slightly as a function of space. The image blocks are transformed into numerous curves of different frequencies. Later, when these curves are put back together through an inverse step, a close approximation to the original block is restored.

After the FDCT step, the 8×8 matrix contains transformed data comprised of 64 DCT coefficients in which the first coefficient, commonly referred to as the DC coefficient, is related to the average of the original 64 values in the block. The other coefficients are commonly referred to as AC coefficients.

Up to this point in the JPEG compression process, little actual image compression has occurred. The 8×8 pixel block has simply been converted into an 8×8 matrix of DCT coefficients. The third step involves preparing the matrix for further compression by quantizing each element in the matrix. The JPEG standard gives two exemplary tables of quantization constants, one for luminance and one for chrominance. These constants were derived from experiments on the human visual system. The 64 values used in the quantization matrix are stored in the JPEG compressed data as part of the header, making dequantization of the coefficients possible. The encoder needs to use the same constants to quantize the DCT coefficients.

Each DCT coefficient is divided by its corresponding constant in the quantization table and rounded off to the nearest integer. The result of quantizing the DCT coefficients is that smaller, unimportant coefficients will disappear and larger coefficients will lose unnecessary precision. As a result of this quantization step, some of the original image quality is lost. However, the actual image data lost is often not visible to the human eye at normal magnification.

Quantizing produces a list of streamlined DCT coefficients that can now be very efficiently compressed using either a Huffman or arithmetic encoding scheme. Thus the final step in the JPEG compression algorithm is to encode the data using an entropy encoding scheme. Before the matrix is encoded, it is arranged in a one-dimensional vector in a zigzag order. The coefficients representing low frequencies are moved to the beginning of the vector and the coefficients representing higher frequencies are placed towards the end of the vector. By placing the higher frequencies (which are more likely to be zeros) at the end of the vector, an end of block code truncates the larger sequence of zeros which permits better overall compression.

Equations (1) and (2) describe the process for performing a FDCT, i.e., taking the data from the real domain into the DCT domain. When it is necessary to reverse this step, i.e., transform the data from the DCT domain to the real domain, a DCT operation known as an Inverse Discrete Cosine Transform (IDCT), or an inverse transform operation, can be performed.

For a one-dimensional, inverse transform operation, the IDCT is defined as follows:

$$s(n) = \sum_{k=0}^{N-1} c(k)\tilde{s}(k)\cos\frac{\pi(2n+1)k}{2N}, \quad (3)$$

where $s$ is the array of $N$ original values, $\tilde{s}$ is the array of $N$ transformed values and the coefficients $c$ are given by $c(k) = \sqrt{\frac{1}{N}}$ for $k = 0$; $c(k) = \sqrt{\frac{2}{N}}$ for $k > 0$ For an inverse transform operation in two dimensions where N=8, the IDCT is defined:

$$s(m, n) = \sum_{i=0}^{7}\sum_{j=0}^{7} c(i, j)\tilde{s}(i, j)\cos\frac{\pi(2m+1)i}{16}\cos\frac{\pi(2n+1)j}{16}, \quad (4)$$

where $s$ is an $8 \times 8$ matrix of 64 values, $\tilde{s}$ is an $8 \times 8$ matrix of 64 coefficients and the constants $c(i, j)$ are given by $c(i, j) = \frac{1}{8}$ when $i = 0$ and $j = 0$;

$c(i, j) = \frac{1}{4\sqrt{2}}$ if $i = 0$ and $j > 0$ or $i > 0$ and $j = 0$;

$c(i, j) = \frac{1}{4}$ when $i, j > 0$

As previously stated, digital images are often transmitted and stored in compressed data formats, such as the previously described JPEG standard. In this context, there often arises the need to scale down (i.e., reduce) the dimensions of an image that is provided in a compressed data format in order to achieve a suitable image size.

For example, where an image is to be sent in compressed data format to receivers of different computational and output capabilities, it may be necessary to scale down the size of the image to match the capabilities of each receiver. For example, some printers are designed to receive images which are of a certain size, but the printers must have the capability of scaling down the image size for printing purposes, particularly when the original image was intended for a higher resolution output.

A known method for scaling down an image provided in a compressed data format is illustrated in FIG. 1. First, a determination is made as to the amount of desired image reduction 1/B. (Block 10) If, for example, an image reduction by a factor of 3 is desired (i.e., dividing by 3 or multiplying by ⅓), then 3 adjacent 8×8 blocks of transformed data values (for a total of 64×3 or 192 values) are retrieved from the image. (Block 11) An IDCT is performed on each of the three blocks to transform the pixel or pel data into the real or spatial domain. (Block 12) Once in the real domain, the data is reduced from 3 adjacent 8×8 data blocks into a single 8×8 data block by any one of several, known filtering techniques. (Block 13) Then a FDCT operation is performed on the data of the single 8×8 data block to return the data to the DCT domain. (Block 14) The process is repeated for all remaining data in the input image. (Block 15)

Thus given a portion of an image in a JPEG/DCT compressed data format consisting of four compressed 8×8 blocks of image data, scaling down the image by a factor of two in each dimension using a previously known method requires: (1) entropy decoding the data which is in one-dimensional vector format and placing the data in 8×8 blocks; (2) de-quantizing the data; (3) performing four 8×8 IDCT operations to inverse transform the transformed blocks of image data; (4) additional filtering operations to scale down the blocks of image data into one 8×8 block of scaled image data; (5) an 8×8 FDCT operation to re-transform the block of scaled image data; (6) quantizing the 8×8 block of data; and (7) placing the block of data in one-dimensional vectors and entropy encoding the data for storage or transmission. Given the mathematical complexity of the FDCT and IDCT operations, such a large number of operations is computationally time consuming.

What is needed is an efficient method and apparatus that operates directly upon transformed blocks of image data to convert them into transformed blocks of scaled-down image data.

SUMMARY OF THE PREFERRED EMBODIMENTS

To overcome the limitations in the prior art described above, preferred embodiments disclose a method, system, and data structure for the scaling down of data. At least two blocks of transformed data samples representing at least two blocks of original data samples are received. One of at least two tables of constants is selected wherein each table of constants is capable of reducing the number of transformed data samples by a different factor. The constants taken from the selected table are applied to the at least two blocks of transformed data samples to produce one block of transformed data samples representing one block of final data samples.

In another embodiment, a method for generating a plurality of constants for use in decreasing the number of original data samples by a factor of B is provided. An inverse transform operation is applied on B sets of original transform coefficients to obtain B sets of variables in the real domain as a function of the B sets of original transform coefficients. The B sets of variables in the real domain are scaled down to produce a single set of variables representing scaled data samples in the real domain. A forward transform operation is applied to the single set of variables to obtain a single set of new transform coefficients as a function of the B sets of original transform coefficients. This, in turn, yields the plurality of constants.

BRIEF DESCRIPTION OF THE DRAWINGS

FIGS. 7a and 7b are graphical representations of the scaling down of a portion of a transformed image in accordance with the inventions disclosed herein.

FIG. 11 is a table of values for the selection of tables of constants for the scaling up or scaling down of data by integer and non-integer amounts.

DETAILED DESCRIPTION OF THE PREFERRED EMBODIMENTS

In the following description, reference is made to the accompanying drawings which form a part hereof and which illustrate several embodiments of the present invention. It is understood that other embodiments may be used and structural and operational changes may be made without departing from the scope of the present invention.

For purposes of illustrating the invention, the well-known JPEG and MPEG DCT transform operation of images is being used. However, the same techniques can be used to compress any two-dimensional array of data. DCT transform operations work best when the data contains some internal correlation that the FDCT can then de-correlate.

Computing Environment

Figure 1:
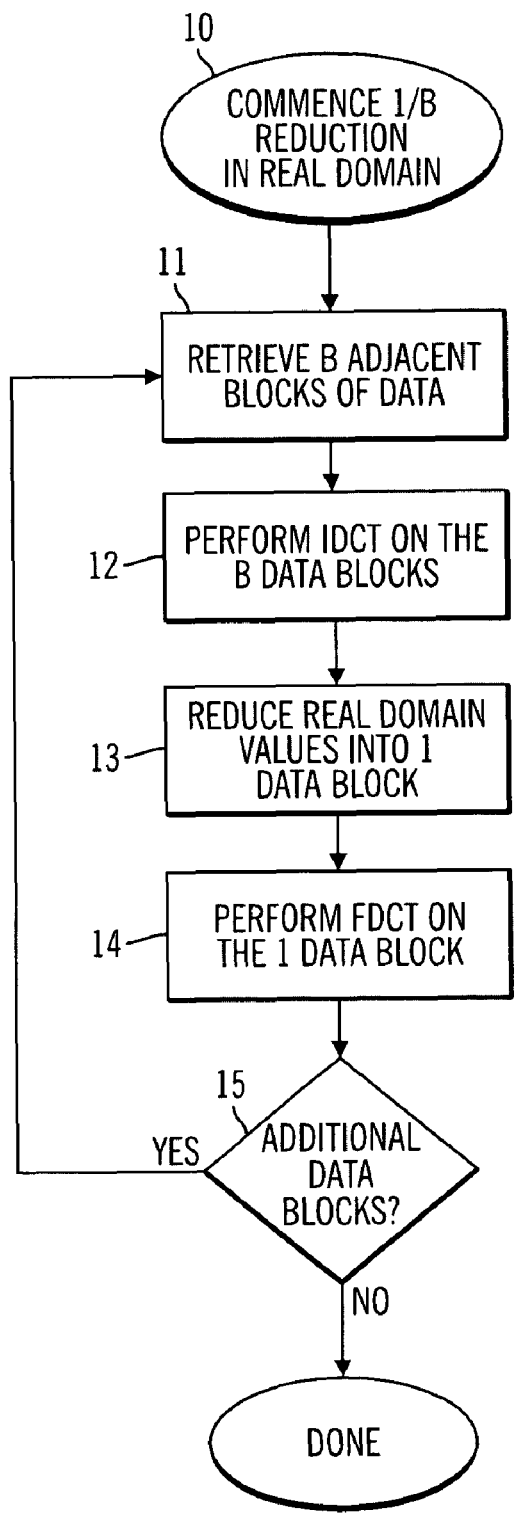
FIG. 1 illustrates the logic for a known method of scaling down the size of an input image which is received in transformed format.
Figure 2:
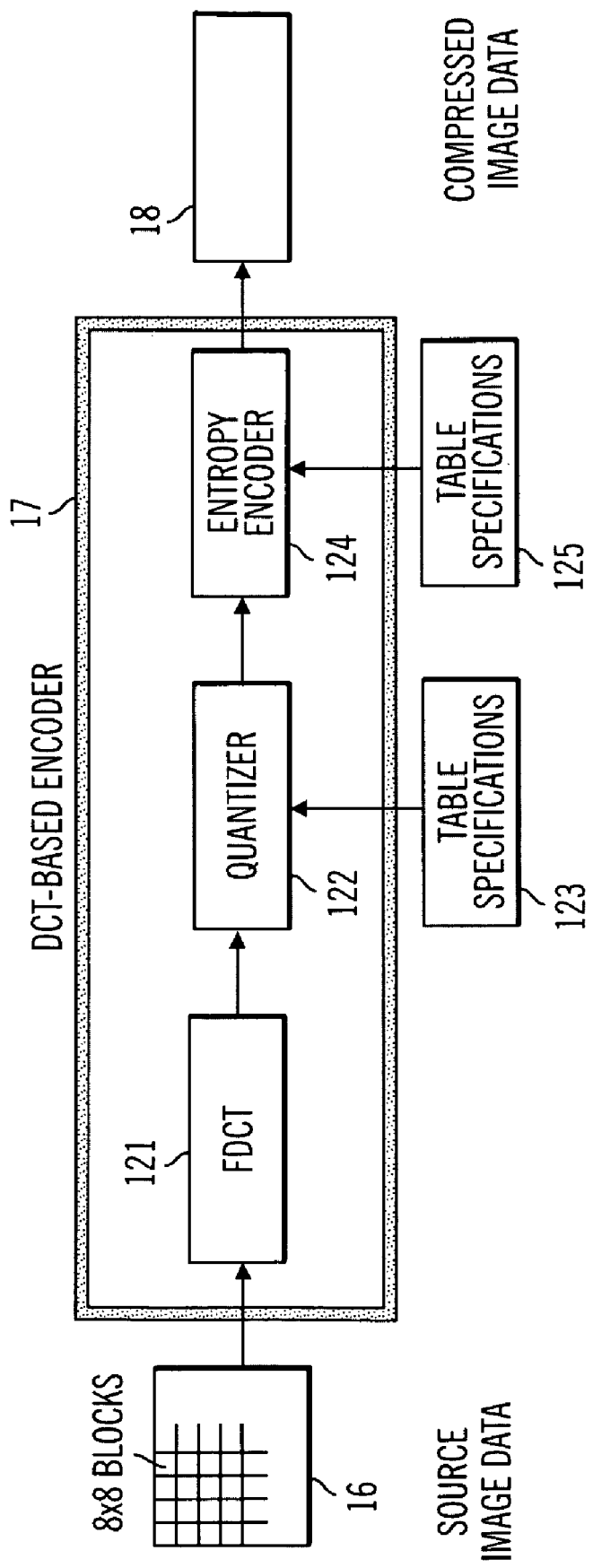
FIG. 2 is a simplified block diagram of a DCT-based JPEG encoder.

Referring now to the drawings, and more particularly to FIG. 2, there is shown a simplified block diagram of a DCT-based encoder. A source image sampled data 16 in 8×8 blocks are input to the encoder 17. Each 8×8 data block is transformed by the Forward Discrete Cosine Transform (FDCT) 121 into a set of 64 values, referred to as DCT coefficients or transformed data samples. One of these values is referred to as the DC coefficient, and the other 63 values are referred to as AC coefficients. Each of the 64 transformed data samples are then quantized by quantizer 122 using one of 64 corresponding input quantization values from a quantization table 123. The quantized transformed data samples are then passed to an entropy encoding procedure 124 using table specifications 125. This procedure compresses the data further. One of two entropy encoding procedures can be used, Huffman encoding or arithmetic encoding. If Huffman encoding is used, the Huffman table specifications must be provided, but if arithmetic encoding is used, then arithmetic coding conditioning table specifications must be provided. The previous quantized DC coefficient is used to predict the current DC coefficient and the difference is encoded. The 63 AC coefficients, however, are not differentially encoded but, rather, are converted into a zig-zag sequence. The output of the entropy encoder is the compressed image data 18.

Figure 3:
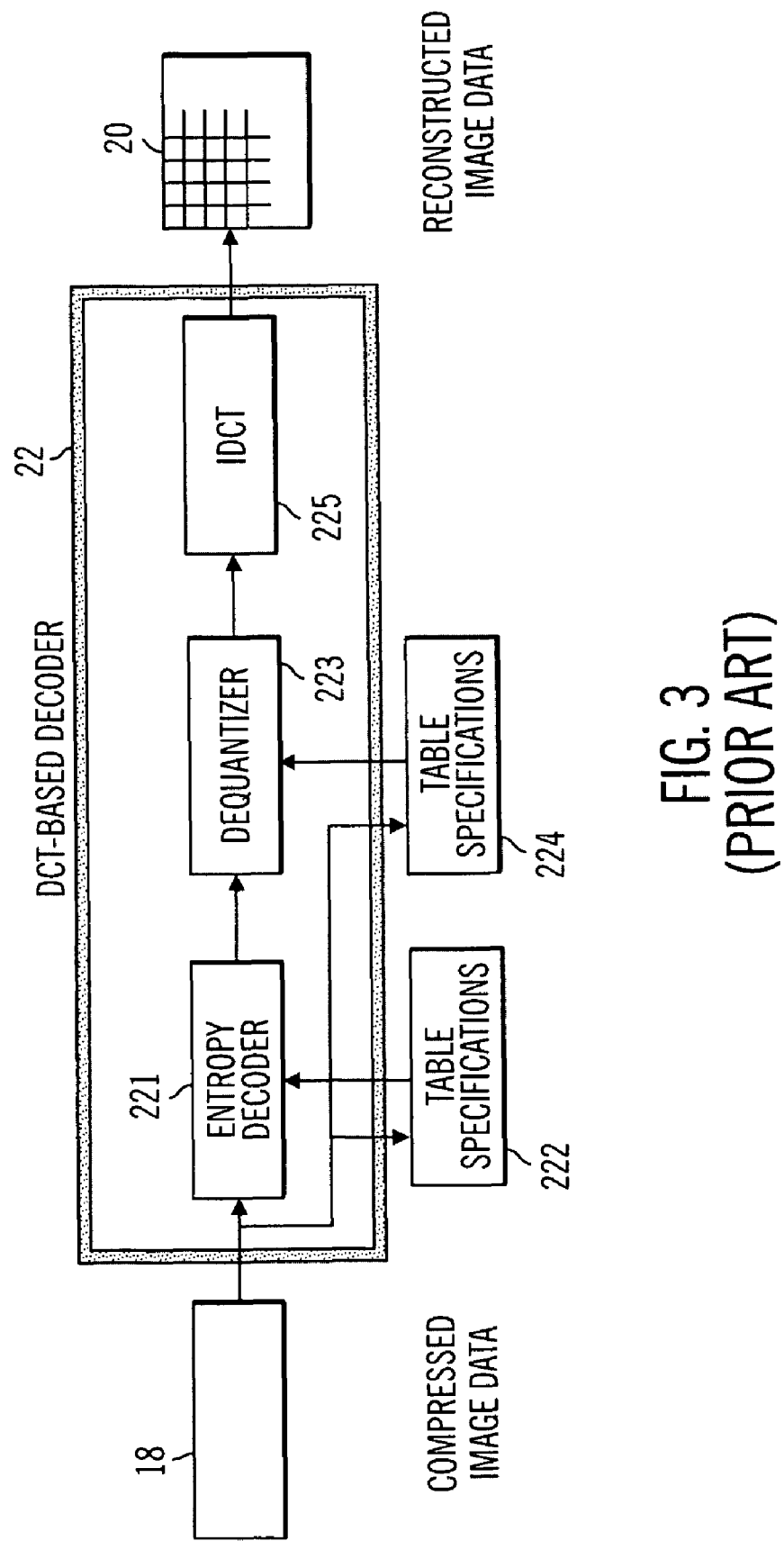
FIG. 3 is a simplified block diagram of a DCT-based JPEG decoder.

FIG. 3 shows a simplified block diagram of the DCT-based decoder. Each step shown performs essentially the inverse of its corresponding main procedure within the encoder shown in FIG. 2. The compressed image data 18 is input to the decoder 22 where it is first processed by an entropy decoder procedure 221 which decodes the zig-zag sequence of the quantized DCT coefficients. This is done using either Huffman table specifications or arithmetic coding conditioning table specifications 222, depending on the coding used in the encoder. The quantized DCT coefficients (or quantized transformed data samples) output from the entropy decoder are input to the dequantizer 223 which, using quantization table specifications 224 comprising output quantization values, outputs dequantized DCT coefficients to Inverse Discrete Cosine Transform (IDCT) 225. The output of the IDCT 225 is the reconstructed image 20.

Figure 4:
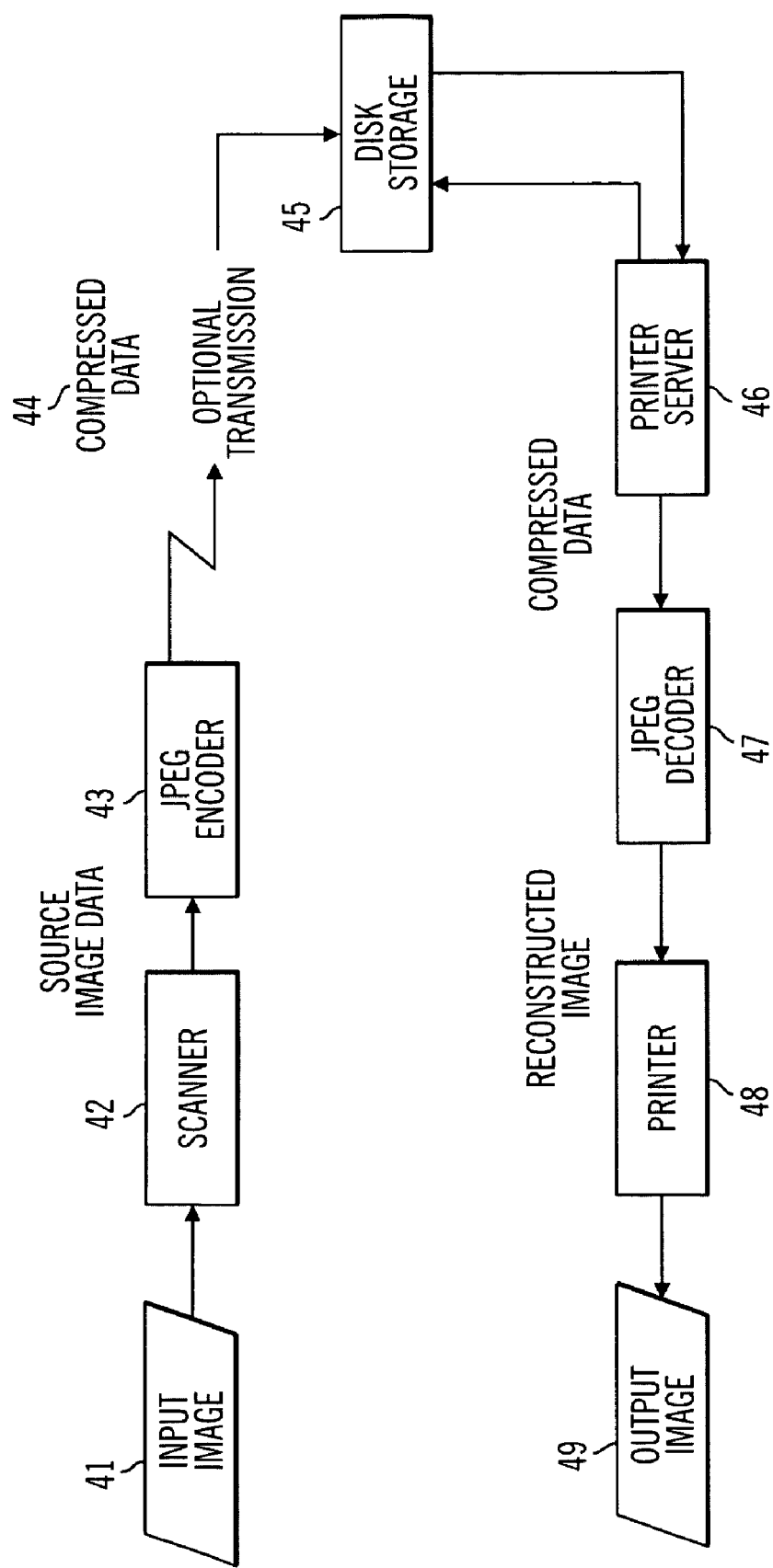
FIG. 4 is a block diagram of a simple printing system that uses JPEG compressed images.

FIG. 4 shows a block diagram of a simple printing system that uses JPEG compressed images. For this illustration, the input image is assumed to be a grayscale image comprised of samples from only one component and the printer, a grayscale printer. The input image 41 is scanned in the scanner 42 and then the source image data, a single component of gray, is compressed with a JPEG encoder 43, such as described with reference to FIG. 2. The JPEG encoder 43 is shown separately from the scanner 42, but in a practical embodiment, the JPEG encoder 43 could be incorporated with the scanner 42. The output of the JPEG encoder 43 is compressed data 44. After optional transmission, the compressed data is stored on a disk storage device 45. At some later time, the compressed data stored on the disk storage device 45 is retrieved by the printer server 46 which scales the image in the transformed domain. The scaled image is recompressed in the printer server 46 so that the JPEG decoder 47 decodes the reconstructed scaled-down image. The JPEG decoder 47 is as described with reference to FIG. 3. The printer 48 prints the grayscale scaled image and produces the output image 49 on paper.

Reduction of Image Size

The preferred embodiments of the present invention include a method, system and data structure for efficiently scaling down data which is received in a transformed or a DCT-based data format. A one-dimensional DCT-domain reduction method is disclosed that scales down B blocks of data along one dimension into 1 block where B is the reduction factor for the entire set of data along one axis.

Figure 5:
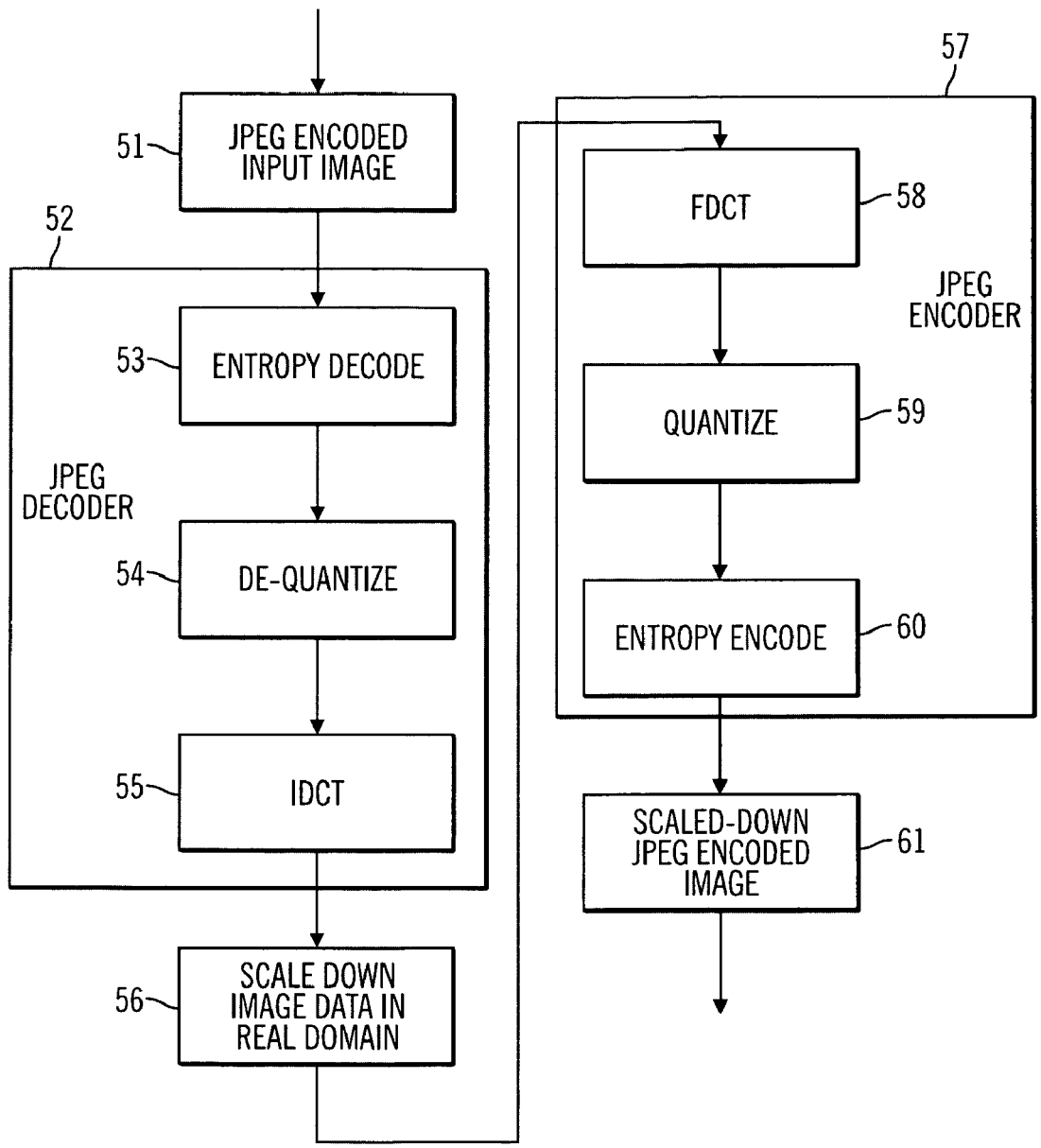
FIG. 5 is a simplified block diagram showing the scaling down of the size of an input image.

FIG. 5 shows a known, traditional method for the reduction of images. The compressed image 51 is JPEG decoded by JPEG decoder 52. The decoder 52 first entropy decodes 53 the data which arrives in one-dimensional vector format and places the data in two-dimensional block format. Next the data is taken through a de-quantizing step 54. Finally, an IDCT operation 55 is performed to inverse transform the transformed blocks of image data to the real domain.

When in the real domain, the image data is manipulated 56 by additional filtering operations to scale down the blocks of image data into fewer blocks of scaled image data.

The scaled data is sent to the JPEG encoder 57 where the process is reversed. First, FDCT operations 58 are performed to re-transform the reduced number of blocks of scaled image data from the real domain to the DCT domain. The transformed data is then quantized 59, placed in a one-dimensional vector and entropy encoded 60 for storage or transmission as a JPEG encoded image of scaled down dimensions 61. Thus it is seen that the known, scale down method of FIG. 5 involves performing scale down operations on data which is in the real domain.

Figure 6A:
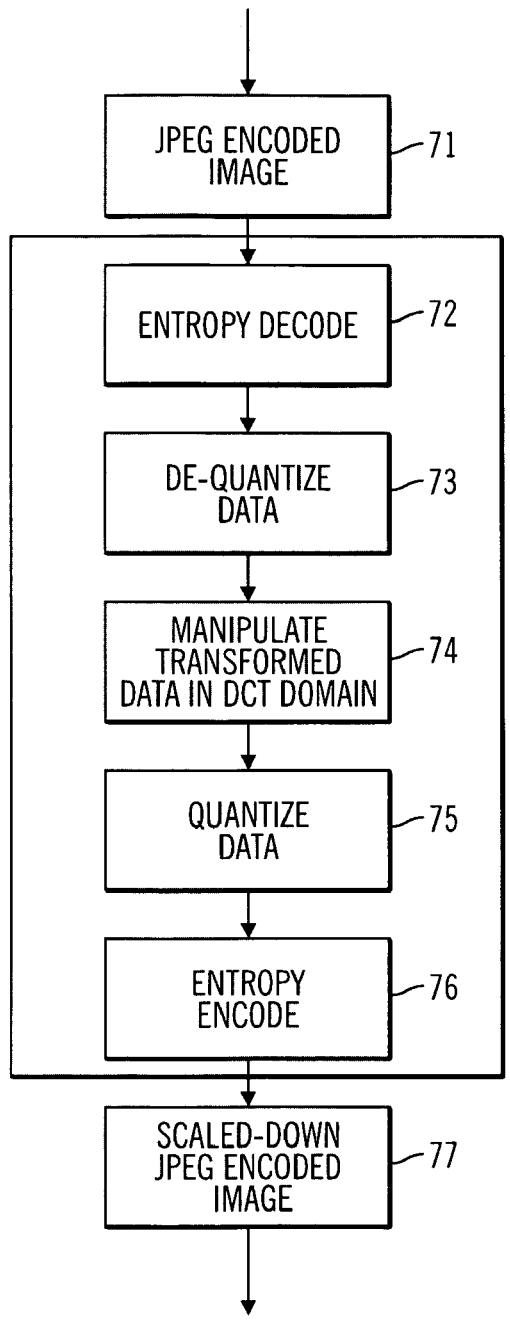
FIGS. 6a and 6b are simplified block diagrams showing the scaling down of the size of an input image by incorporating the principles of certain embodiments of the present invention.
Figure 6B:
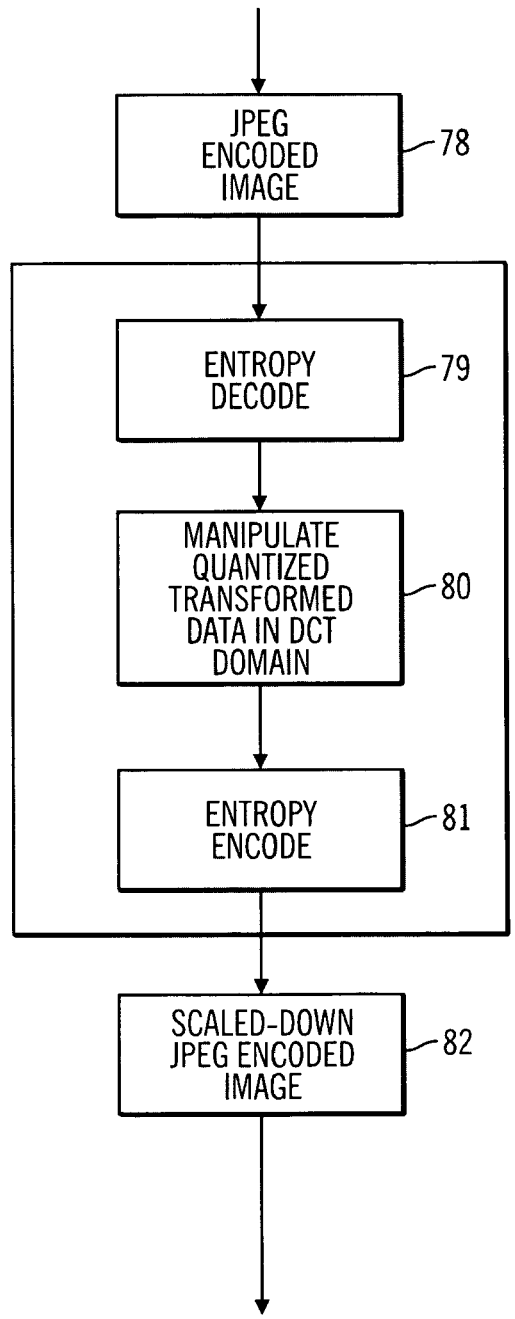

FIGS. 6a and 6b show the application of the present invention resulting in a faster scaling down of data. Referring first to FIG. 6a, the compressed image 71 is JPEG entropy decoded 72 and then de-quantized 73. As will be explained in more detail below, the transformed, dequantized data is then manipulated to create fewer blocks of transformed data while remaining in the DCT domain 74 in contrast to being processed in the real domain as shown in FIG. 5. Then the DCT coefficients of the scaled-down image are re-quantized 75 and JPEG entropy encoded 76 to produce a JPEG encoded image of scaled down dimensions 77. This can greatly increase the speed of processing image data in, for example, high speed printers.

FIG. 6b shows an alternative embodiment of the present invention which provides a possibly faster method of scaling down data. The compressed image 78 is JPEG entropy decoded 79 to produce quantized DCT, or transformed, data. As will be explained in more detail below, the quantized DCT coefficients are then directly manipulated and scaled down while remaining in the DCT domain 80. Then the quantized DCT coefficients of the scaled down image are entropy encoded 81 to produce a JPEG encoded image of scaled down dimensions 82. Thus in contrast to the embodiment of FIG. 6a, the embodiment of FIG. 6b combines the de-quantizing and quantizing steps into the manipulation step 80.

Embodiments of the present invention involve scaling down transformed data while remaining in the DCT domain by multiplying the DCT coefficients directly by one or more tables of constants. The result of such multiplication is a reduced number of DCT coefficients, which if inverse transformed into the real domain, would correspond to a scaled down image. As can be appreciated by a comparison of the known method of FIG. 5 with the inventive embodiments of FIGS. 6a and 6b, this relatively simple multiplication step replaces the more computationally intensive steps associated with the FDCT and IDCT operations.

As explained in more detail below, a table of constants for use in scaling down a number of original data samples by a factor of B is developed by applying an inverse transform operation on B sets of original transform coefficients to obtain B sets of variables in the real domain as a function of the B sets of original transform coefficients. The B sets of variables in the real domain are scaled down to produce a single set of variables representing scaled data samples in the real domain. A forward transform operation is applied to the single set of variables to obtain a single set of new transform coefficients as a function of the B sets of original transform coefficients. This, in turn, yields the plurality of constants which can be stored and recalled whenever desired to directly operate on the input transformed data and derive reduced-sized image transform data.

Figures 7A, 7B:
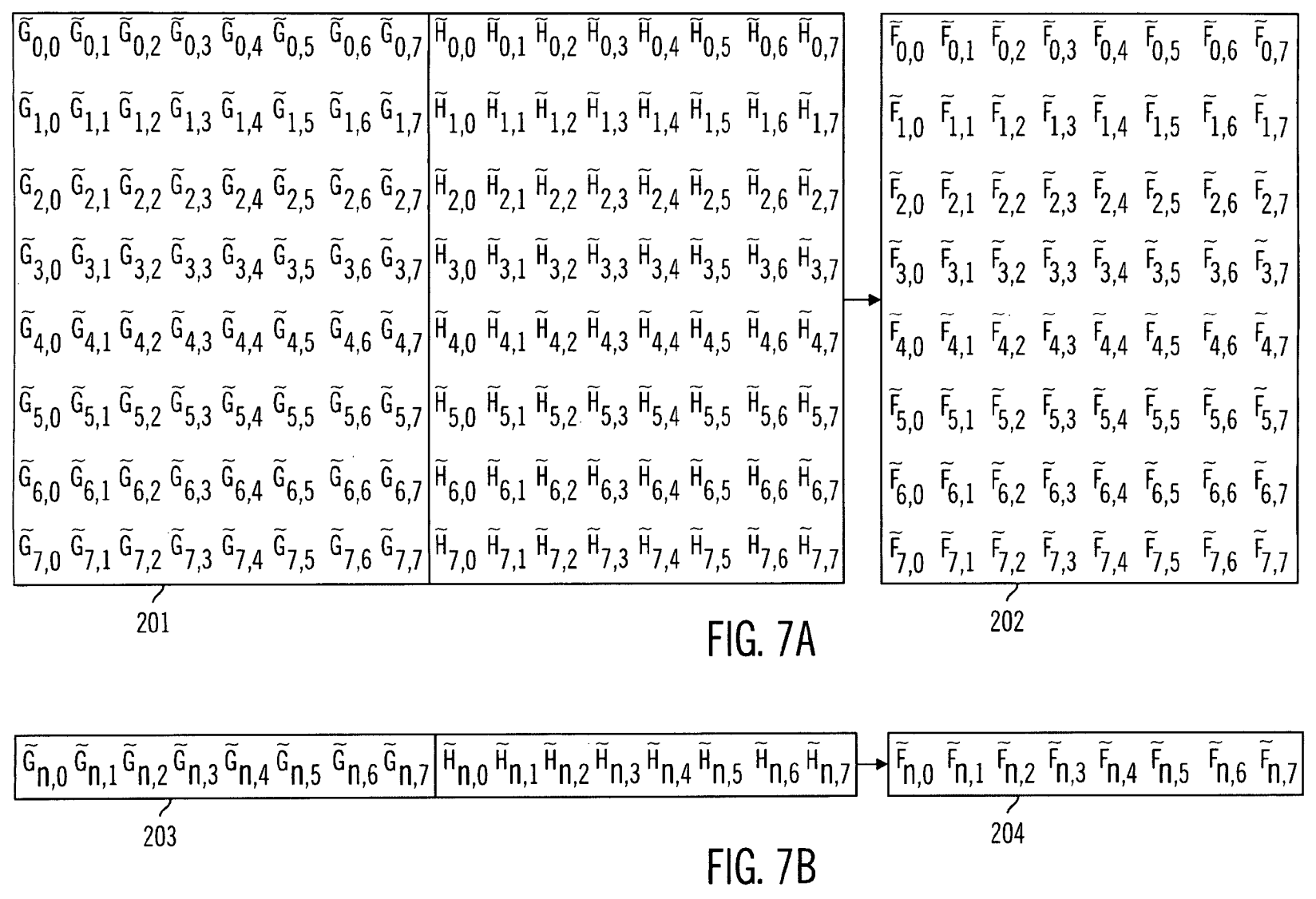

Referring to FIG. 7a, a portion of a transformed image is represented by two adjacent 8×8 blocks 201 of DCT coefficients: $\tilde{G}_{0,0} \ldots \tilde{G}_{7,7}$ and $\tilde{H}_{0,0} \ldots \tilde{H}_{7,7}$. If for example a reduction of ½ in the X axis is desired, the preferred embodiments operate directly upon these DCT coefficients to produce one 8×8 block 202 of DCT coefficients, $\tilde{F}_{0,0} \ldots \tilde{F}_{7,7}$, which, if inverse transformed, would yield an image of ½ size of the original along the X axis.

FIG. 7a represents the result in one dimension when all data in two blocks have been processed. In actual practice however, the inventive methods operate in one dimension on a sub-block 203 consisting of one row of data as shown in FIG. 7b. The output sub-blocks, or rows, 204 are sequentially created until two complete, original 8×8 data blocks have been scaled down.

Figure 8:
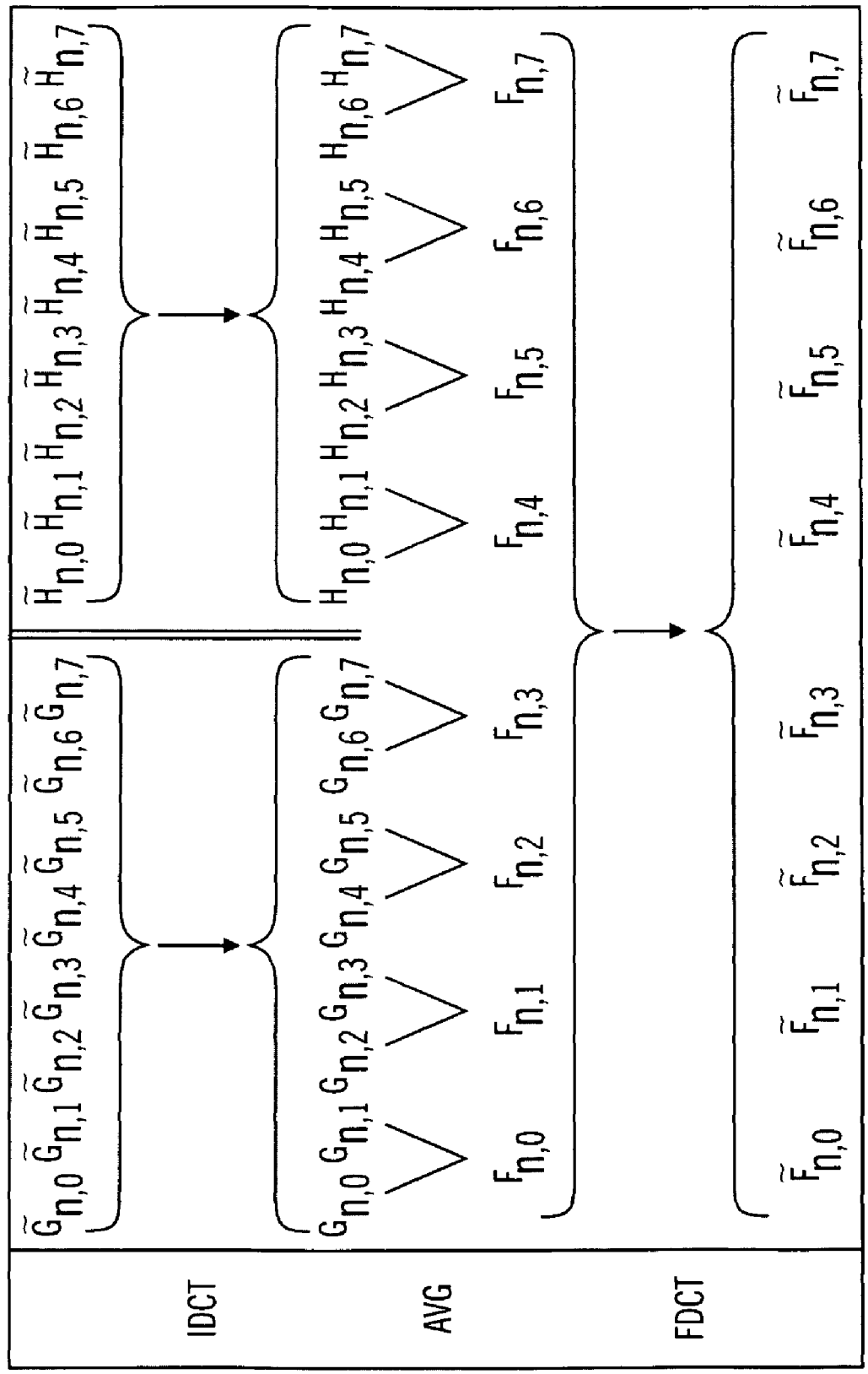
FIG. 8 is a graphical representation of the relationship between the DCT coefficients in a portion of an input transformed image and the DCT coefficients of a portion of a resulting scaled-down image.

FIG. 8 illustrates the relationship between the DCT coefficients in the reduced image and those of the original in an example where an image reduction amount of ½ in one dimension is desired according to one embodiment of the present invention. A row of coefficients from two adjacent 8×8 blocks is retrieved. These rows are represented by $\tilde{G}_{n,0} \ldots \tilde{G}_{n,7}$ and $\tilde{H}_{n,0} \ldots \tilde{H}_{n,7}$. Using equation (3), an IDCT operation is performed on each of these rows which transforms the data from the DCT domain to the spatial or real domain, giving pixel values, $G_{n,0} \ldots G_{n,7}$ and $H_{n,0} \ldots H_{n,7}$. To accomplish an image reduction of ½ in one dimension in the real domain, each pair of adjacent pixel values are averaged. This is a filtering process, and this particular method is referred to as a low pass filter. This averaged value is represented in FIG. 8 by $F_{x,y}$, where $F_{n,0}=½ (G_{n,0}+G_{n,1})$, $F_{n,1}=½ (G_{n,2}+G_{n,3})$, ..., $F_{n,7}=½ (H_{n,6}+H_{n,7})$. Finally, these averaged, spatial domain values, $F_{x,y}$, are transformed into the DCT domain by use of equation (1).

FIGS. 7a, 7b and 8 illustrate graphically the relationship between the input DCT image data, $\tilde{G}$, $\tilde{H}$ and the reduced image DCT data, $\tilde{F}$. Mathematically, this relationship is shown as follows.

Again for example using an image reduction factor of 2 in one dimension on a one-dimensional data block of 1×8 coefficients, a representation of a plurality of transform coefficients of a set of variables is made. This is in the form of a row of data in one dimension for two adjacent data blocks, $\tilde{G}_0, \ldots \tilde{G}_7, \tilde{H}_0, \ldots \tilde{H}_7$. The relationship between each value in the spatial domain and its counterpart in the DCT domain is represented by the IDCT equations as follows:

$$G_x = \sum_{u=0}^{7} C_u \tilde{G}_u \cos\left(\frac{(2x+1)\pi u}{16}\right) \quad (5)$$

$$H_x = \sum_{u=0}^{7} C_u \tilde{H}_u \cos\left(\frac{(2x+1)\pi u}{16}\right) \quad (6)$$

where $$C = \frac{1}{\sqrt{8}} \text{ for } u = 0 \text{ and } C = \frac{1}{2} \text{ for } u > 0$$

Using for example a low pass filtering technique, each pair of these values is averaged to achieve the image reduction of ½ in one dimension which is represented as follows:

$$F_0 \equiv \frac{1}{2}(G_0 + G_1), F_1 \equiv \frac{1}{2}(G_2 + G_3), \ldots, F_7 \equiv \frac{1}{2}(H_6 + H_7) \quad (7)$$

The FDCT equation is applied to each spatial domain value of the reduced image to transform these back into the DCT domain:

$$\tilde{F}_v = C_v \sum_{x=0}^{7} F_x \cos\left(\frac{(2x+1)\pi v}{16}\right), v = 0, \ldots, 7 \quad (8)$$

Now, since $F_0=½ (G_0+G_1)$, $F_1=½ (G_2+G_3)$, ... $F_7=½ (H_6+H_7)$, each of these expressions for $F_0, \ldots F_7$ can be substituted in equation (8) which can then be represented as follows:

$$\tilde{F}_v = C_v \sum_{x=0}^{3} \left\{\frac{1}{2}(G_{2x} + G_{2x+1})\right\} \cos\left(\frac{(2x+1)\pi v}{16}\right) + \quad (9)$$

$$C_v \sum_{x=4}^{7} \left\{\frac{1}{2}(H_{2x-8} + H_{2x-7})\right\} \cos\left(\frac{(2x+1)\pi v}{16}\right)$$

The expressions for G and H from equations (5) and (6) can be substituted for each occurrence of G and H in equation (9) as follows:

$$\tilde{F}_v = C_v \begin{bmatrix} \sum_{x=0}^{3} \frac{1}{2} \begin{Bmatrix} \sum_{u=0}^{7} C_u \tilde{G}_u \cos\left(\frac{(4x+1)\pi u}{16}\right) + \\ \sum_{u=0}^{7} C_u \tilde{G}_u \cos\left(\frac{(4x+3)\pi u}{16}\right) \\ \cos\left(\frac{(2x+1)\pi v}{16}\right) + \end{Bmatrix} \\ \sum_{x=4}^{7} \frac{1}{2} \begin{Bmatrix} \sum_{u=0}^{7} C_u \tilde{H}_u \cos\left(\frac{(4x-15)\pi u}{16}\right) + \\ \sum_{u=0}^{7} C_u \tilde{H}_u \cos\left(\frac{(4x-13)\pi u}{16}\right) \\ \cos\left(\frac{(2x+1)\pi v}{16}\right) \end{Bmatrix} \end{bmatrix} \quad (10)$$

From equation (10) it can be appreciated that the values $\tilde{F}$ which are reduced image coefficients in the DCT domain now are a function of $\tilde{G}$ and $\tilde{H}$ which are the original sized image coefficients, also in the DCT domain. Equation (10) can be algebraically simplified into the following representation:

$$\tilde{F}_v = \frac{1}{2} \sum_{u=0}^{7} C_u C_v \begin{Bmatrix} \begin{bmatrix} \sum_{x=0}^{3} \cos\left(\frac{(4x+1)\pi u}{16}\right) + \\ \cos\left(\frac{(4x+3)\pi u}{16}\right) \\ \cos\left(\frac{(2x+1)\pi v}{16}\right) \end{bmatrix} \tilde{G}_u + \\ \begin{bmatrix} \sum_{x=4}^{7} \cos\left(\frac{(4x-15)\pi u}{16}\right) + \\ \cos\left(\frac{(4x-13)\pi u}{16}\right) \\ \cos\left(\frac{(2x+1)\pi v}{16}\right) \end{bmatrix} \tilde{H}_u \end{Bmatrix} \quad (11)$$

for $v = 0, \ldots, 7$ where $$C_u, C_v = \frac{1}{\sqrt{8}} \text{ for } u, v = 0 \text{ and } C_u, C_v = \frac{1}{2} \text{ for } u, v > 0$$

From equation (11) it is apparent that not only is $\tilde{F}$ a function of $\tilde{G}$ and $\tilde{H}$, but that this relationship involves only constants. Appendix A contains an exemplary table of constants which are used to obtain a ½ reduction in a one dimensional row for values $\tilde{F}_0, \ldots \tilde{F}_7$, using a low pass filtering technique.

Thus for example, taking the first row of values from the $\tilde{G}$ block matrix and the first row from the $\tilde{H}$ block matrix of Appendix A, $\tilde{F}_0=0.50000\tilde{G}_0-0.00000\tilde{G}_1+0.00000\tilde{G}_2-0.00000\tilde{G}_3+$
$0.00000\tilde{G}_4-0.00000\tilde{G}_5-0.00000\tilde{G}_6-0.00000\tilde{G}_7+$
$0.50000\tilde{H}_0-0.00000\tilde{H}_1+0.00000\tilde{H}_2-0.00000\tilde{H}_3+$
$0.00000\tilde{H}_4-0.00000\tilde{H}_5+0.00000\tilde{H}_6-$
$0.00000\tilde{H}_7=0.50000\tilde{G}_0+0.50000\tilde{H}_0$ Similarly for example, taking the second row of values from the $\tilde{G}$ block matrix and the second row of values from the $\tilde{H}$ block matrix of Appendix A, $\tilde{F}_1 0.45306\tilde{G}_0 + 0.20387\tilde{G}_1 - 0.03449\tilde{G}_2 + 0.00952\tilde{G}_3 +$
  $0.00000\tilde{G}_4 - 0.00636\tilde{G}_5 + 0.01429\tilde{G}_6 + 0.04055\tilde{G}_7 -$
  $0.045306\tilde{H}_0 + 0.20387\tilde{H}_1 + 0.03449\tilde{H}_2 + 0.00952\tilde{H}_3 -$
  $0.00000\tilde{H}_4 - 0.00636\tilde{H}_5 - 0.01429\tilde{H}_6 - 0.04055\tilde{H}_7$ Equation (11) yields a table of constants based upon a low pass filter technique where $F_0 = \frac{1}{2}(G_0+G_1)$, $F_1 = \frac{1}{2}(G_2+G_3)$, etc. However, a similar methodology as that described above can be used to obtain alternative equations and corresponding tables of constants which are based upon other types of filters.

For example instead of a low pass filter which is based upon the averaging of two values, a 1:2:1 filter, collocated on the left, could be used. Data filtered by this algorithm is represented as $F_0 = (3G_0+G_1)/4$, $F_1 = (G_1+2G_2+G_3)/4$, $F_2 = (G_3+2G_4+G_5)/4, \ldots, F_7 = (H_5+2H_6+H_7)/4$. Similarly, a 1:2:1 filter, collocated on the right, could be used. This is represented by $F_0 = (G_1+2G_2+G_3)/4$, $F_1 = (G_3+2G_4+G_5)/4, \ldots, F_6 = (H_4+2H_5+H_6)/4$, $F_7 = (H_6+3H_7)/4$. Other filters can be employed without departing from the spirit of the invention.

Figure 9:
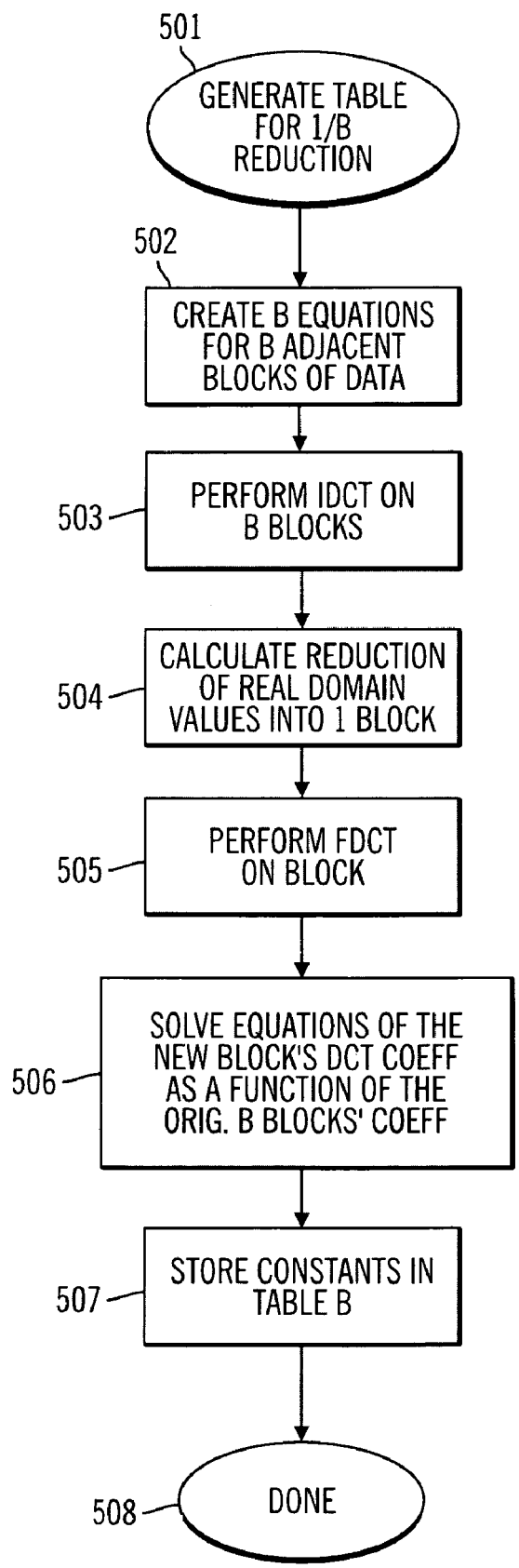
FIG. 9 illustrates the logic to generate a table of constants for the scaling down of data by a factor of B.

FIG. 9 illustrates the logic for a generalized approach in developing a table of constants in accordance with the previously described embodiment. At block 501 a determination is made as to the amount of image reduction, 1/B, where B is an integer. Thus for example if an image size reduction of ⅓ is desired, then B is set equal to 3. At block 502, a representation of a set of image data is created in the form of B equations for one row of B adjacent blocks of data. In the instance where B=3, the 3 exemplary equations could be $\tilde{G}=(\tilde{G}_0, \ldots, \tilde{G}_7)$, $\tilde{H}=(\tilde{H}_0, \ldots, \tilde{H}_7)$, and $\tilde{I}=(\tilde{I}_0, \ldots, \tilde{I}_7)$.

Next an IDCT is performed on the row of B adjacent data blocks in order to obtain real domain expressions. (Block 503). The real domain representations for B blocks are reduced to 1 block by a filtering technique of choice, whereupon a FDCT is performed on the 1 block of real domain expressions. (Blocks 504 & 505). These equations are next solved so that the new data block's coefficients are expressed as a function of the original B blocks' coefficients. (Block 506) It has been shown that this relationship results in a group of constants which can then be stored in a Table B for future use in reducing any input image in DCT format by 1/B of the original size in one dimension. (Block 507)

The method of FIG. 9 can be repeated as many times as desired for different reduction amounts, such as ½, ⅓, ¼, ⅕, etc. Different tables of constants can be generated for each reduction amount and can be stored in computer memory. Thus a computer system containing a set of such tables will be able to rapidly perform an image reduction of any amount selected by the user which corresponds to a table of constants. The constants from these tables can be applied directly by multiplying them by the input image DCT coefficients. This results in an output image of reduced size in the DCT domain.

An alternative technique for developing a representation of the DCT coefficients of a reduced image as a function of an original image's coefficients is as follows. Again, taking the example of reducing the original image by ½ in one dimension, a set of data representing a row from two adjacent blocks, G and H, in the real domain are taken and represented to be equal to one larger block F, where $F=(F_0, \ldots, F_{15})$, as follows:

$$F_0 = G_0, F_1 = G_1, \ldots, F_8 = H_0, \ldots, F_{15} = H_7, \quad (12)$$

or $$F_u \equiv \sum_{u=0}^{7} G_u + \sum_{u=8}^{15} H_{(u-8)}$$

Using a scaled version of the FDCT equation (1), the transform coefficients for F (a block of 16 values) can be represented as:

$$\tilde{F}_u = C_u \sum_{x=0}^{15} F_x \cos\left(\frac{(2x+1)\pi u}{32}\right), u = 0, \ldots, 7, \quad (13)$$

(or alternatively $u = 0, \ldots, 15$)

where $$C_u = \frac{1}{2\sqrt{2}} \text{ for } u = 0 \text{ and } C_u = \frac{1}{2} \text{ for } u > 0$$

Note that the $C_u$ is defined as an 8 sample DCT notwithstanding that a 16 sample DCT is in fact being used for equation 13. Hence these are referred to as "scaled" DCT transforms. Note also that while equation (13) is valid for all values of $u=0, \ldots, 15$, this is not necessary in most cases. Since we normally are only concerned with the lowest eight frequencies, this equation can be simplified by discarding the upper eight frequencies and using only $u=0, \ldots, 7$.

Since $G_x = F_x$ and $H_x = F_{x+8}$ for $x=0, \ldots, 7$, we can substitute these in equation (13) as follows:

$$\tilde{F}_u = C_u \left( \sum_{x=0}^{7} G_x \cos\left(\frac{(2x+1)\pi u}{32}\right) + \sum_{x=8}^{15} H_{(x-8)} \cos\left(\frac{(2x+1)\pi u}{32}\right) \right) \quad (14)$$

for $u = 0, \ldots, 7$

Using the scaled version of the IDCT equation (3), we have the relationships:

$$G_x = \sum_{v=0}^{7} C_v \tilde{G}_v \cos\left(\frac{(2x+1)\pi v}{16}\right) \quad (15)$$

$$H_x = \sum_{v=0}^{7} C_v \tilde{H}_v \cos\left(\frac{(2x+1)\pi v}{16}\right), x = 0, \ldots, 7 \quad (16)$$

where $$C_v = \frac{1}{2\sqrt{2}} \text{ for } v = 0 \text{ and } C_v = \frac{1}{2} \text{ for } v > 0$$

Substituting these values for $G_x$ and $H_x$ into equation (14) yields the final representation:

$$\tilde{F}_u = \sum_{v=0}^{7} C_u C_v \left\{ \begin{bmatrix} \left[ \sum_{x=0}^{7} \cos\left(\frac{(2x+1)\pi v}{16}\right) \right] \tilde{G}_v + \\ \cos\left(\frac{(2x+1)\pi u}{32}\right) \\ \left[ \sum_{x=0}^{7} \cos\left(\frac{(2x+1)\pi v}{16}\right) \right] \tilde{H}_v \\ \cos\left(\frac{(2x+17)\pi u}{32}\right) \end{bmatrix} \right\} \quad (17)$$

for $u = 0, \ldots, 7$ where $C_u, C_v = \frac{1}{2\sqrt{2}}$ for $u, v = 0$ and $C_u, C_v = \frac{1}{2}$ for $u, v > 0$ As before, it is apparent from equation (17) that not only is $\tilde{F}$ a function of $\tilde{G}$ and $\tilde{H}$, but that this relationship involves only constants. Appendix B contains an exemplary table of constants which are used to obtain a ½ reduction in a one dimensional row for values $\tilde{F}_0, \ldots \tilde{F}_7$. It will be noted that the constants in both Appendices A and B, although different, can be used to achieve a ½ image reduction. The choice is left to the user based upon user needs and preferences.

Once again, it can be appreciated that although the above described embodiment is illustrative of a reduction of ½ in one dimension, similar methodologies can be employed to develop equations and corresponding tables of constants for other reduction amounts 1/B, where B=3, 4, 5, etc.

Figure 10:
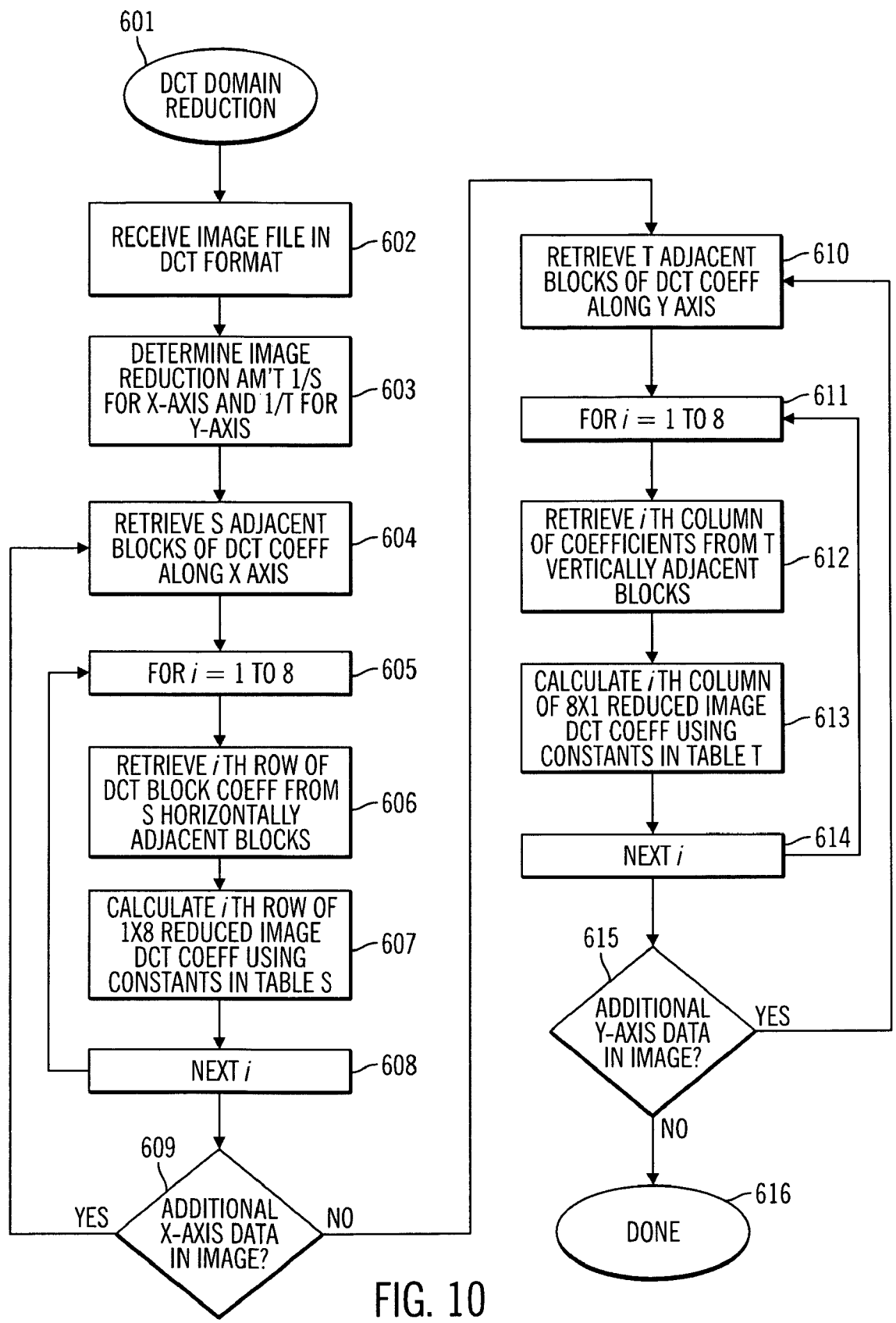
FIG. 10 illustrates the logic to scale down the dimensions of the whole of an input transformed image.

FIG. 10 illustrates the steps for employing these tables of constants to reduce the size of an input image. The process commences with the receipt of an image file in DCT format. (Blocks 601 & 602). A determination is made of the amount of image scale down in both the X-axis and Y-axis. (Block 603) The reduction amounts do not have to be equal in both axes. Thus for example if the user desired a ½ image scale down for the X-axis and a ¼ scale down for the Y-axis, then for purposes of FIG. 10, S=2 and T=4.

Next a scale down procedure along the X-axis is commenced by retrieving S adjacent blocks of DCT coefficients along the X-axis. (Block 604) The 1$^{st}$ row or sub-block of S×8 coefficients from the adjacent blocks is retrieved (block 606) and used to calculate the 1$^{st}$ row of 1×8 reduced image DCT coefficients using the constants previously stored in Table S. Thus 8 coefficients would be calculated. (Block 607) These coefficients would represent the 1$^{st}$ row of a single 1×8 data block along the X-axis.

Table S is one of two or more tables of constants stored in computer memory, each of which can be used to scale down image data by a different factor. In this example, Table S contains the constants which correspond to a scale down factor of 2. This calculation is accomplished by multiplying the S×8, or 16, coefficients of the original image by the constants from Table S.

The process of blocks 606 and 607 is repeated for rows or sub-blocks 2 through 8 of the retrieved, adjacent S data blocks to thereby generate one 8×8 block of reduced image coefficients along the X-axis. Next, a determination is made whether the original image contains additional data blocks along the X-axis to be processed. (Block 609) If so, control loops to block 604 where the next group of S blocks of DCT coefficients are retrieved. The previously described process continues until all X-axis image data has been scaled down.

When there is no longer any X-axis image data to scale down, control transfers to block 610 where T adjacent blocks of DCT coefficients along the Y-axis are retrieved. In the case where a Y-axis image scale down factor of 3 is selected, then 3 adjacent data blocks would be retrieved. The process of blocks 610 through 615 of FIG. 10 is the same as that described for blocks 604 through 609 except that now the calculations proceed along columns of data for Y-axis reduction, rather than along rows of data.

From FIGS. 6a and 10 it can be seen that by maintaining tables of constants in memory for various scale down factors, such as ½, ⅓, ¼, ⅕, etc., it is possible to rapidly transform a larger image which is represented by a file containing DCT domain data into a reduced sized image by multiplying the DCT domain data with these constants. It is not necessary to perform an IDCT to transform the image into the spatial domain, reduce the image size while in the spatial domain, and then perform a FDCT to again transform the image file— a procedure which is computationally much more intensive.

The foregoing has been described with respect to data blocks of 8×8 data. However it should be appreciated that the inventions claimed herein can apply to any data block which, for these purposes, is meant to be any set of data including, but not limited to, one or two dimensional arrays of data of any size.

Referring again to FIG. 6b, it further should be appreciated by those skilled in the art that an alternative embodiment of the present invention involves the incorporation of the de-quantization and re-quantization steps into the tables of constants, or matrices, in the following way:

Assume that the constants defining a particular block of a particular one dimensional transform-based scale-down scheme are known to be D=($d_{ij}$) with i,j=0, . . . , 7. Let Q=($q_i$) and R=($r_i$) (with i=0, . . . , 7) be the desired quantization vectors for the input and output, respectively. These quantizations can be incorporated into the transform matrix D to obtain new constants C=($c_{ij}$) where $c_{ij}=d_{ij}\cdot(q_j/r_i)$. Thus by including the de-quantization and re-quantization values in the tables of constants, it can be seen that even faster scaling down operations can be realized.

Thus using this method, a plurality of input and output quantization values is received. Also a block of quantized transformed data samples associated with the input quantization values is received wherein the block of quantized transformed data samples represents a block of original data samples. A table of constants capable of decreasing the number of transformed data samples by a different factor is selected. The plurality of input and output quantization values are applied to the selected table of constants to produce a plurality of new constants. The plurality of new constants is applied to the blocks of quantized transformed data samples to produce one block of quantized transformed data samples associated with the output quantization values wherein the quantized transformed data samples represent one block of final data samples.

An advantage of the approaches of either FIG. 6a or FIG. 6b is that it is not necessary to handle 64×N samples during the reduction process. It is a characteristic of the JPEG standard that the original, quantized DCT coefficients are usually rather sparse and that most rows in the blocks contain coefficients which are a value of zero. Thus under this method, the reduced blocks will keep these rows as zeros. Other rows frequently have only 1, 2 or 3 coefficients that are non-zero. These cases can be handled with much simplified equations that have discarded the zero terms.

Another advantage of the disclosed embodiments relates to the conducting of these computations in one dimension. Blocks of data are scaled down independently along each axis. Thus one is not restricted to identical scaling in the X and Y directions. For example, an image could be reduced by a factor 3 on the X-axis and by a factor of 2 on the Y-axis.

Because the disclosed method incorporates independent treatment of each axis in one dimension, it is further possible to scale up the image size on one axis and reduce the size on the other axis. In an alternative embodiment, the scaling up of images in DCT format can be accomplished through the use of tables of constants which are derived from equations based upon scaling up algorithms. These equations and constants are derived as follows.

Using for example a scale up factor of 2 in one dimension on a 1×8 pixel or pel row of values from a data block in the real domain, a representation of a set of image data is made. This is in the form of a row of data, $F_0, \ldots F_7$ Since in this example the image is to be enlarged or scaled up by a factor of two in one dimension, the values for $F_0, \ldots F_7$ are mathematically interpolated to form an enlarged 1×16 block of pixel or pel values, $F_0, \frac{1}{2}(F_0+F_1), F_1, \frac{1}{2}(F_1+F_2), F_2, \ldots, F_7$. Next, this 1×16 block of values is re-defined to be the same as two, adjacent 1×8 blocks, $G_0, \ldots, G_7$ and $H_0, \ldots H_7$.

Mathematically, this can be represented as follows:

$$G=(F_0, \tfrac{1}{2}(F_0+F_1), F_1, \tfrac{1}{2}(F_1+F_2), F_2, \tfrac{1}{2}(F_2+F_3), F_3, \tfrac{1}{2}(F_3+F_4))$$

$$H=(\tfrac{1}{2}(F_3+F_4), F_4, \tfrac{1}{2}(F_4+F_5), F_5, \tfrac{1}{2}(F_5+F_6), F_6, \tfrac{1}{2}(F_6+F_7), F_7) \quad (18)$$

Note that with this method, the two interpolated pel values between $F_3$ and $F_4$ are equal to one another.

Next, G and H are represented in the DCT domain by use of the FDCT equation (1) as follows:

$$\tilde{G}_u = C_u \sum_{x=0}^{7} G_x \cos\left(\frac{(2x+1)\pi u}{16}\right) \text{ for } u = 0, \ldots, 7 \text{ and} \quad (19)$$

$$\tilde{H}_u = C_u \sum_{x=0}^{7} H_x \cos\left(\frac{(2x+1)\pi u}{16}\right) \text{ for } u = 0, \ldots, 7$$

where $$C_u = \frac{1}{2\sqrt{2}} \text{ for } u = 0, \; C_u = \frac{1}{2} \text{ for } u > 0$$

and where $$G_x = \begin{cases} F_{x/2}, & x = 0, 2, 4, 6 \\ \frac{1}{2}(F_{(x-1)/2} + F_{(x+1)/2}), & x = 1, 3, 5, 7 \end{cases}$$

and $$H_x = \begin{cases} \frac{1}{2}(F_{(x+6)/2} + F_{(x+8)/2}), & x = 0, 2, 4, 6 \\ F_{(x+7)/2}, & x = 1, 3, 5, 7 \end{cases}$$

Since the $G_x$'s and $H_x$'s in equation (19) can also be expressed in terms of the original 8 samples $F_0, \ldots, F_7$, we can use the IDCT relation of equation (3) to express the DCT coefficients for G and H as given in equation (19) in terms of the original DCT coefficients $\tilde{F}_0 \ldots \tilde{F}_7$ for the sample block F:

$$F_x = \sum_{u=0}^{7} C_u \tilde{F}_u \cos\left(\frac{(2x+1)\pi u}{16}\right) \text{ for } x = 0, \ldots, 7 \quad (20)$$

where $$C_u = \frac{1}{2\sqrt{2}} \text{ for } u = 0, \; C_u = \frac{1}{2} \text{ for } u > 0$$

By substituting equation (20) into equation (19) and regrouping, it is possible to obtain the following:

$$\tilde{G}_v = \frac{C_v}{2} \sum_{u=0}^{7} C_u \left\{ \begin{array}{l} K_1(v)\cos\left(\frac{\pi u}{16}\right) + K_2(v)\cos\left(\frac{3\pi u}{16}\right) + \\ K_3(v)\cos\left(\frac{5\pi u}{16}\right) + K_4(v)\cos\left(\frac{7\pi u}{16}\right) + \\ \cos\left(\frac{15\pi v}{16}\right)\cos\left(\frac{9\pi u}{16}\right) \end{array} \right\} \tilde{F}_u \quad (21)$$

and $$\tilde{H}_v = \frac{C_v}{2} \sum_{u=0}^{7} C_u \left\{ \begin{array}{l} \cos\left(\frac{\pi v}{16}\right)\cos\left(\frac{7\pi u}{16}\right) + K_5(v)\cos\left(\frac{9\pi u}{16}\right) + \\ K_6(v)\cos\left(\frac{11\pi u}{16}\right) + K_7(v)\cos\left(\frac{13\pi u}{16}\right) + \\ K_8(v)\cos\left(\frac{15\pi u}{16}\right) \end{array} \right\} \tilde{F}_u \quad (22)$$

where $C_u$ and $C_v = \frac{1}{2\sqrt{2}}$ for $u, v = 0$ and where $C_u$ and $C_v = \frac{1}{2}$ for $u, v > 0$ and where $K_1(v) = 2D_1^v + D_3^v, \; K_2(v) = D_3^v + 2D_5^v + D_7^v,$ $K_3(v) = D_7^v + 2D_9^v + D_{11}^v, \; K_4(v) = D_{11}^v + 2D_{13}^v + D_{15}^v,$ $K_5(v) = D_1^v + 2D_3^v + D_5^v, \; K_6(v) = D_5^v + 2D_7^v + D_9^v,$ $K_7(v) = D_9^v + 2D_{11}^v + D_{13}^v, \; K_8(v) = D_{13}^v + 2D_{15}^v$ $D_x^v \equiv \cos\left(\frac{x\pi v}{16}\right)$ From equations (21) and (22), it can be appreciated that the values $\tilde{G}$ and $\tilde{H}$, which are the enlarged image coefficients in the DCT domain, now are expressed as a function of $\tilde{F}$ which are the originally sized image coefficients, also in the DCT domain. As before with the scale-down algorithms, equations (21) and (22) show that not only are $\tilde{G}$ and $\tilde{H}$ a function of $\tilde{F}$, but that this relationship involves only constants.

Equations (21) and (22) yield a table of constants based upon the piecewise-linear interpolation technique of equation (18). However, a similar methodology as that described above can be used to obtain alternative equations and corresponding tables of constants which are based upon other types of image enlargement techniques. For example, instead of using a piecewise-linear interpolation method, replication methods (i.e., repeating each image pel N times per axis) or spline fit methods (i.e., using polynomial curves) may be employed without departing from the spirit of the invention.

Moreover, alternative embodiments of scale-up methods and apparatuses are described in greater detail in co-pending application Ser. No. 09/570,382, filed concurrently herewith which application is incorporated herein by reference in its entirety.

A mixing and matching of tables of constants for scaling up and scaling down can extend to sequential operations on the same image to achieve scaling by a ratio of integer amounts. When applied alone, the tables of constants only scale an image by integer amounts. That is, if an image reduction, or scale down, is desired, then applying only one table of constants to an image permits image reduction of 1/B, where B is an integer. Similarly, applying only one table of constants for image enlargement, or scaling up, permits enlargement by a factor of A, where A is an integer.

However, by applying a combination of tables, one each for scaling up and scaling down, to image data, then additional non-integer resizing factors can be achieved. For example, if it is desired to enlarge an image by a factor of 2.5, such would not be possible by the use of one scale-up table alone. No integer value for A will result in a scale-up factor of 2.5. However, a table of constants for scaling up an image by a factor of 5 can be used followed by another table for scaling down the enlarged image by a factor of 2. The final image therefore would be resized by a value of 5/2 or 2.5.

Thus it can be seen that by employing any number of combinations of tables for the scaling up and scaling down of an image, a large variety of resizing factors can be achieved. FIG. 11 is a table of values illustrating various integer and non-integer resizing factors which can be achieved with a set of 22 tables—11 for scaling up data by factors of 2 through 12, and 11 tables for scaling down data by ½ through 1/12. In FIG. 11, dots (.) are placed in those locations where the values are repeated in the table of FIG. 11 and thus are not necessary.

Still referring to FIG. 11, if for example it is desired to create a new image which is 0.75 of the size of the original image, then that value is located in the table. It can be seen that 0.75 corresponds to a numerator A of 3 and a denominator B of 4. By taking image data and applying the table of constants corresponding to a scale up of 3, followed by the application of a second table of constants corresponding to a scale down of ¼, then the resulting image would be resized by a factor of ¾, or 0.75, of the original.

The values in the table of FIG. 11 can be placed in a computer look-up table format whereby the numerators and denominators corresponding to multiple, non-integer and integer resizing factors can be easily retrieved, and the tables of constants corresponding to those numerators and denominators can be sequentially employed for any given input, transformed image data.

Although the table of FIG. 11 illustrates resizing factors for A and B equal to 1 through 12, it will be appreciated that tables similar to FIG. 11, but using a far greater number of values for A and B, can be employed.

In summary, preferred embodiments disclose a method, system and data structure for reducing the size of an input image in transformed format. (These could have come from compressed data that has been entropy decoded.) At least two blocks of transformed data samples representing at least two blocks of original data samples are received. One of at least two tables of constants is selected wherein each table of constants is capable of reducing the number of transformed data samples by a different factor. The constants taken from the selected table are applied to the at least two blocks of transformed data samples to produce one block of transformed data samples representing one block of final data samples.

In another embodiment, a method for generating a plurality of constants for use in decreasing a number of original data samples by a factor of B is provided. An inverse transform operation is applied on B sets of original transform coefficients to obtain B sets of variables in the real domain as a function of the B sets of original transform coefficients. The B sets of variables in the real domain are scaled down to produce a single set of variables representing scaled data samples in the real domain. A forward transform operation is applied to the single set of variables to obtain a single set of new transform coefficients as a function of the B sets of original transform coefficients. This, in turn, yields the plurality of constants.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

APPENDIX A

| Constant matrix defining transform from the $\ddot{G}$ block to the $\ddot{F}$ block of a 2 to 1 scale-down | | | | | | | |
|---|---|---|---|---|---|---|---|
| 0.50000 | −0.00000 | 0.00000 | −0.00000 | 0.00000 | −0.00000 | 0.00000 | −0.00000 |
| 0.45306 | 0.20387 | −0.03449 | 0.00952 | 0.00000 | −0.00636 | 0.01429 | −0.04055 |
| −0.00000 | 0.49039 | −0.00000 | 0.00000 | −0.00000 | 0.00000 | −0.00000 | −0.09755 |
| −0.15909 | 0.38793 | 0.23710 | −0.04055 | −0.00000 | 0.02710 | −0.09821 | −0.07716 |
| 0.00000 | −0.00000 | 0.46194 | −0.00000 | 0.00000 | −0.00000 | −0.19134 | 0.00000 |
| 0.10630 | −0.17284 | 0.35485 | 0.20387 | 0.0000 | −0.13622 | −0.14698 | 0.03438 |
| −0.00000 | 0.00000 | −0.00000 | 0.41573 | −0.00000 | −0.27779 | 0.00000 | −0.00000 |
| −0.09012 | 0.13622 | −0.17338 | 0.35991 | −0.00000 | −0.24048 | 0.07182 | −0.02710 |
| Constant matrix defining transform from the $\ddot{H}$ block to the $\ddot{F}$ block of a 2 to 1 scale-down | | | | | | | |
| 0.50000 | −0.00000 | 0.00000 | −0.00000 | 0.00000 | −0.00000 | 0.00000 | −0.00000 |
| −0.45306 | 0.20387 | 0.03449 | 0.00952 | −0.00000 | −0.00636 | −0.01429 | −0.04055 |
| 0.00000 | −0.49039 | 0.00000 | −0.00000 | −0.00000 | −0.00000 | 0.00000 | 0.09755 |
| 0.15909 | 0.38793 | −0.23710 | −0.04055 | −0.00000 | 0.02710 | 0.09821 | −0.07716 |
| 0.00000 | −0.00000 | 0.46194 | −0.00000 | 0.00000 | −0.00000 | −0.19134 | 0.00000 |
| −0.10630 | −0.17284 | −0.35485 | 0.20387 | −0.00000 | −0.13622 | 0.14698 | 0.03438 |
| 0.00000 | −0.00000 | 0.00000 | −0.41573 | 0.00000 | 0.27779 | −0.00000 | 0.00000 |
| 0.09012 | 0.13622 | 0.17338 | 0.35991 | −0.00000 | −0.24049 | −0.07182 | −0.02710 |

APPENDIX B

| Constant matrix defining transform from the G̃ block to the F̃ block of a 2 to 1 scale-down | | | | | | | |
|---|---|---|---|---|---|---|---|
| 0.50000 | 0.09012 | 0.00000 | 0.10630 | 0.00000 | 0.15909 | 0.00000 | 0.45306 |
| 0.45306 | 0.28832 | 0.03733 | 0.08668 | 0.09012 | 0.10913 | 0.18767 | 0.38399 |
| −0.00000 | 0.49039 | 0.17678 | 0.00000 | 0.19134 | 0.00000 | 0.42678 | −0.09755 |
| −0.15909 | 0.34010 | 0.38409 | 0.05735 | 0.10630 | 0.17362 | 0.25664 | −0.31765 |
| 0.00000 | −0.03733 | 0.46194 | 0.25664 | 0.00000 | 0.38409 | −0.19134 | −0.18767 |
| 0.10630 | −0.18235 | 0.25664 | 0.42362 | 0.15909 | 0.19265 | −0.38409 | −0.01346 |
| −0.00000 | 0.00000 | −0.07322 | 0.41573 | 0.46194 | −0.27779 | −0.17678 | −0.00000 |
| −0.09012 | 0.13399 | −0.18767 | 0.24443 | 0.45306 | −0.41332 | 0.03733 | −0.03832 |
| Constant matrix defining transform from the H̃ block to the F̃ block of a 2 to 1 scale-down | | | | | | | |
| 0.50000 | 0.09012 | 0.00000 | 0.106030 | 0.00000 | 0.15909 | 0.00000 | 0.45306 |
| −0.45306 | 0.11943 | 0.10630 | −0.06765 | 0.09012 | −0.12184 | 0.15909 | −0.46510 |
| 0.00000 | −0.49039 | −0.17678 | −0.00000 | −0.19134 | −0.00000 | −0.42678 | 0.09755 |
| 0.15909 | 0.43577 | −0.09012 | −0.13846 | 0.10630 | −0.11943 | 0.45306 | 0.16332 |
| 0.00000 | −0.03733 | 0.46194 | 0.25664 | 0.00000 | 0.38409 | −0.19134 | −0.18767 |
| −0.10630 | −0.16332 | −0.45306 | −0.01587 | 0.15909 | −0.46510 | −0.09012 | 0.08221 |
| 0.00000 | −0.00000 | 0.07322 | −0.41573 | −0.46194 | 0.27779 | 0.17678 | 0.00000 |
| 0.09012 | 0.13846 | 0.15909 | 0.47540 | 0.45306 | −0.06765 | −0.10630 | −0.01587 |

What is claimed is:

1. A system for scaling down a number of data samples by a factor of B, wherein B>2, comprising:
a processing unit for executing software routines; and
program logic executed by the processing unit, comprising:
   means for receiving more than two blocks of quantized transformed data samples, the more than two blocks of quantized transformed data samples representing more than two blocks of original data samples;
   means for generating at least two tables of constants, wherein each table of constants is capable of reducing the number of quantized transformed data samples by a different factor of B, wherein each table of constants is generated by:
      means for applying an inverse transform operation on B sets of original transform coefficients to obtain B sets of variables in a real domain as a function of the B sets of original transform coefficients;
      means for scaling down the B sets of variables in the real domain to produce a single set of variables representing scaled data samples in the real domain based on a filtering technique; and
      means for applying a forward transform operation to the single set of variables to obtain a single set of new transform coefficients as a function of the B sets of original transform coefficients, wherein the single set of new transform coefficients yields constants that are stored in a table of constants;
   means for selecting one of at least two tables of constants;
   means for dequantizing the quantized transformed data samples; and
   means for applying the constants taken from the selected table to more than two blocks of dequantized transformed data samples to produce one block of transformed data samples representing one block of final data samples, wherein applying the constants further comprises means for applying the constants to a set of B adjacent blocks of dequantized transformed data samples to produce for each set of B adjacent blocks a single block of transformed data samples representing a single block of final data samples.

2. The system of claim 1, wherein the means for applying the constants further comprises:
   means for multiplying at least two adjacent sub-blocks of dequantized transformed data samples by the constants, the at least two adjacent sub-blocks being taken from the more than two blocks of dequantized transformed data samples.

3. The system of claim 2, in which:
the at least two adjacent sub-blocks of dequantized transformed data samples are taken from B adjacent blocks of the dequantized transformed data samples.

4. The system of claim 1, wherein the data samples are image component samples.

5. The system of claim 1, wherein the number of data samples is in an array having a first and a second dimension, wherein the more than two blocks of quantized transformed data samples is in an array having a first and a second dimension, and wherein the constants are applied to the first dimension of the transformed data sample array to produce one block of transformed data samples representing one block of final data samples in the first dimension.

6. A system for scaling down a number of data samples by a factor of A/B, where A and B are integers >1 and where A<B, and wherein the factor of A/B is not reducible to ½, the system comprising:
a processing unit for executing software routines; and
program logic executed by the processing unit, comprising:
   means for receiving a block of quantized transformed data samples, the block of quantized transformed data samples representing a block of original data samples;
   means for selecting a first table and a second table from a group of at least two tables of constants, wherein the first and second tables of constants are each generated by applying an inverse transform operation on the data samples to obtain sets of variables in a real domain, by scaling down the sets of variables in the real domain to produce a single set of variables representing scaled data samples in the real domain based on a filtering technique, and by applying a forward transform operation to the single set of variables to obtain a single set of new transform coefficients as a function of B sets of original transform coefficients, wherein the single set of new transform coefficients yields constants that are stored in a table of constants;

means for dequantizing the block of quantized transformed data samples;

means for applying the constants taken from the first table to the block of dequantized transformed data samples to produce A blocks of transformed data samples representing A blocks of intermediate data samples; and means for applying the constants taken from the second table to the A blocks of transformed data samples to produce A/B blocks of transformed data samples representing A/B of final data samples.

7. A computer readable medium not including a signal and storing a program for scaling down a number of data samples by a factor of B, wherein B>2, wherein the program, when executed by a processor, causes operations to be performed, the operations comprising:

receiving more than two blocks of quantized transformed data samples, the more than two blocks of quantized transformed data samples representing more than two blocks of original data samples;

generating at least two tables of constants, wherein each table of constants is capable of reducing the number of quantized transformed data samples by a different factor of B, wherein each table of constants is generated by:

applying an inverse transform operation on B sets of original transform coefficients to obtain B sets of variables in a real domain as a function of the B sets of original transform coefficients;

scaling down the B sets of variables in the real domain to produce a single set of variables representing scaled data samples in the real domain based on a filtering technique; and applying a forward transform operation to the single set of variables to obtain a single set of new transform coefficients as a function of the B sets of original transform coefficients, wherein the single set of new transform coefficients yields constants that are stored in a table of constants;

selecting one of at least two tables of constants;

dequantizing the quantized transformed data samples; and applying the constants taken from the selected table to more than two blocks of dequantized transformed data samples to produce one block of transformed data samples representing one block of final data samples, wherein applying the constants further comprises applying the constants to a set of B adjacent blocks of dequantized transformed data samples to produce for each set of B adjacent blocks a single block of transformed data samples representing a single block of final data samples.

8. The computer readable medium of claim 7, wherein the operations for applying the constants further comprise:

multiplying at least two adjacent sub-blocks of transformed data samples by the constants, the at least two adjacent sub-blocks being taken from the more than two blocks of dequantized transformed data samples.

9. The computer readable medium of claim 8, in which:

the at least two adjacent sub-blocks of transformed data samples are taken from B adjacent blocks of the dequantized transformed data samples.

10. The computer readable medium of claim 7, wherein the data samples are image component samples.

11. The computer readable medium of claim 7, wherein the number of data samples is in an array having a first and a second dimension, wherein the more than two blocks of quantized transformed data samples is in an array having a first and a second dimension, and wherein the constants are applied to the first dimension of the transformed data sample array to produce one block of transformed data samples representing one block of final data samples in the first dimension.

12. A computer readable medium not including a signal and storing a program for scaling down a number of data samples by a factor of A/B, where A and B are integers >1 and where A<B, and wherein the factor of A/B is not reducible to ½, wherein the program, when executed by a processor, causes operations to be performed, the operations comprising:

receiving a block of quantized transformed data samples, the block of transformed data samples representing a block of original data samples;

selecting a first table and a second table from a group of at least two tables of constants, wherein the first and second tables of constants are each generated by applying an inverse transform operation on the data samples to obtain sets of variables in a real domain, by scaling down the sets of variables in the real domain to produce a single set of variables representing scaled data samples in the real domain based on a filtering technique, and by applying a forward transform operation to the single set of variables to obtain a single set of new transform coefficients as a function of B sets of original transform coefficients, wherein the single set of new transform coefficients yields constants that are stored in a table of constants;

dequantizing the quantized transformed data samples;

applying the constants taken from the first table to the block of dequantized transformed data samples to produce A blocks of transformed data samples representing A blocks of intermediate data samples; and applying the constants taken from the second table to the A blocks of transformed data samples to produce A/B blocks of transformed data samples representing A/B blocks of final data samples.

* * * * *